United States Patent
Luo et al.

(10) Patent No.: US 7,686,979 B2
(45) Date of Patent: Mar. 30, 2010

(54) LONG AFTERGLOW LUMINESCENT MATERIAL AND ITS MANUFACTURING METHOD

(75) Inventors: Xixian Luo, Liaoning (CN); Wei Xia, Liaoning (CN); Zhiguo Xiao, Liaoning (CN); Jingjie Yu, Liaoning (CN); Jinxia Duan, Liaoning (CN); Qi Chai, Liaoning (CN)

(73) Assignee: Dalian Luminglight Science and Technology Co., Ltd. (CN)

( * ) Notice: Subject to any disclaimer, the term of this patent is extended or adjusted under 35 U.S.C. 154(b) by 830 days.

(21) Appl. No.: 11/518,603

(22) Filed: Sep. 8, 2006

(65) Prior Publication Data

US 2007/0069181 A1 Mar. 29, 2007

(30) Foreign Application Priority Data

Sep. 23, 2005 (CN) .................. 2005 1 0106004
Mar. 29, 2006 (CN) .................. 2006 1 0070963

(51) Int. Cl.
C09K 11/88 (2006.01)
C09K 11/55 (2006.01)
C09K 11/56 (2006.01)
C09K 11/64 (2006.01)
C09K 11/63 (2006.01)
C09K 11/71 (2006.01)

(52) U.S. Cl. .................. 252/301.4 S; 252/301.4 P; 252/301.4 R

(58) Field of Classification Search ........... 252/301.4 S, 252/301.4 P, 301.4 R
See application file for complete search history.

(56) References Cited

U.S. PATENT DOCUMENTS 5,376,303 A * 12/1994 Royce et al. .......... 252/301.4 R
5,424,006 A *  6/1995 Murayama et al. .... 252/301.4 R

FOREIGN PATENT DOCUMENTS

| CN | 1053807 | 8/1991 |
| CN | 1233641 | 11/1999 |
| JP | 8-269448 | 10/1996 |
| JP | 11-256151 | 9/1999 |
| WO | 02/083814 | 10/2002 |
| WO | 2005/044946 | 5/2005 |

* cited by examiner

*Primary Examiner*—C. Melissa Koslow
(74) *Attorney, Agent, or Firm*—Harness, Dickey & Pierce, P.L.C.

(57) ABSTRACT

A long afterglow luminescent material of the formula $aMO.bM'(S_\beta Se_{1-\beta}).cAl_2O_3.dB_2O_3.eP_2O_5: xEu.yLn$, wherein M is/are selected from Sr, Ca, Ba, and Mg, and any combinations thereof; M' is/are selected from Sr, Ca, and Ba, and any combinations thereof; Ln is/are selected from Nd, Dy, Ho, Tm, La, Ce, Er, Pr, Bi, and Sm, and any combinations thereof; a, b, c, d, e, x and y are mole ratios, wherein $0.5 < a < 6.0$, $0.0001 \leq b \leq 2.0$, $0.5 \leq c \leq 9.0$, $0 \leq d \leq 1.0$, $0 \leq e \leq 1.0$, $0.00001 \leq x \leq 0.25$, $0.00001 \leq y \leq 0.3$, $0 \leq \beta \leq 1.0$, $0.5 < (a+b) \leq 6.0$, $0 < (d+e) \leq 1.0$. The preparation process thereof is a high temperature solid-state reaction comprising an oxidation stage and a subsequent reduction stage.

22 Claims, 9 Drawing Sheets

LONG AFTERGLOW LUMINESCENT MATERIAL AND ITS MANUFACTURING METHOD

FIELD OF THE INVENTION

This invention relates to a long afterglow luminescent material, particularly to a composite aluminate luminescent material comprising sulfur and/or selenium, or a composite aluminate luminescent material comprising sulfur and/or selenium and element phosphorus as well as one or more activator ions, and to the manufacturing method thereof.

BACKGROUND OF THE INVENTION

Since its invention in the nineteenth century, the traditional long afterglow luminescent material of ZnS series has been undergoing continuous improvement, and several typical products have been developed, such as ZnS:Cu (which emits green light), (CaSr)S:Bi (which emits blue light), and (ZnCd) S:Cu (which emits orange yellow light), and have been applied in some commercial fields, however these materials have some defects, such as poor stability, prone to decompose in air, prone to turn gray and even dark in color under sun shine, short luminescence afterglow time which is generally within 0.5 to 2 hours, and low luminescent brightness etc., and can not meet the requirement of practical use. In order to improve the brightness and the afterglow time of these materials, radioactive elements such as Co, Ra, H3 have been added into these materials to produce long afterglow luminescent materials with radioactivity. Such materials can give out light continuously and have ever been used in the fields of aircraft instrument, clocks etc., however their applications were greatly confined because of the radioactive contamination and high cost.

Long afterglow luminescent materials of aluminate system were invented at the beginning 1990s, as described in China patent ZL92110744, ZL98109570.4, ZL 95118116.5, U.S. Pat. Nos. 5,376,303, 5,424,006, their luminescent brightness, long afterglow property and stability were remarkably superior to the sulfide series products described above, and the materials have been used in daily goods, safety marks, clocks etc. However the long afterglow luminescent materials of aluminate system described above still suffer from some disadvantages in practical applications, such as 1. Short afterglow time: the prior art long afterglow luminescent materials of aluminate system have a nominal afterglow time over 24 hours, which however is determined based on the final luminescence intensity equivalent to the brilliance of 0.3 mcd/m$^2$. In fact, the identification capability of naked eyes is very weak under such brilliance, and the application of the long afterglow luminescence materials is greatly limited.
2. Poor applicability: a luminescent material with high brilliance does not necessarily mean the products made with, the luminescent material have high brilliance. The brilliance of a luminescent product depends to a great extent on the matching of the luminescent material with the medium for manufacturing the luminescent product. Many luminescent products can not meet the requirements of various applications, and in practical applications, most of the luminescent materials were used after being fabricated into products.
3. Fast charge is impossible: the light absorption rate of the long afterglow luminescent material prepared by the prior art is slow, and very difficult to reach saturation, which results in that the luminescence intensity and afterglow time of the luminescent materials and the luminescent products can not meet the requirements of practical use well.
4. Lacking of variety in luminescence color: the luminescence color suffers from lacking of variety, and if it is desired to realize multiple colors (peak wavelength of emission spectrum: 440-620 nm), it is necessary to utilize a number of luminescent materials of different systems. It is still unavailable for luminescent materials of the same system realizing multi-color luminescence.

SUMMARY OF THE INVENTION

In view of above defects of the prior art, the present inventors have made a lot of studies on long afterglow luminescent materials, these studies were mainly directed to improve the afterglow time, luminescence intensity, rapid light absorption performance under faint light and multiple luminescence color of the long afterglow luminescent materials and the products thereof. After long terms of practice and a lot of fundamental experiments, the inventors found that a new composite aluminate structure can be produced by partially substituting the oxygen element in the divalent europium-activated aluminate with S and/or Se and by further being optionally doped with P element, to exhibit great improvements in luminescent brightness and afterglow time as well as in application in products of the luminescent materials in terms of luminescent brightness and afterglow time of the products. This present long afterglow luminescent materials are superior to prior art materials, particularly on light absorption rate and afterglow time under faint light condition. Moreover, the invention has developed new long afterglow luminescent materials with luminescence colors which can not be achieved by prior art long afterglow luminescent materials of simple aluminate system or sulfide system.

The present invention provides a new long afterglow luminescent material of a new system other than the long afterglow luminescent materials of aluminate system and silicate system. The present composite aluminate luminescent material comprises sulfur and/or selenium, or comprises sulfur and/or selenium and elemental phosphorus as well as activator ions.

The present invention provides a new long afterglow luminescent material and the manufacturing process thereof, the present material exhibits a variety of luminescence colors, broad spectrum range, good stability, high afterglow intensity and extra long afterglow time, fast charge ability under faint light condition, and outstanding luminescence performance of products containing the present material.

The main chemical composition of the long afterglow luminescent material of the present invention can be expressed by formula (1):

$$a\text{MO} \cdot b\text{M'}(S_\beta Se_{1-\beta}) \cdot c\text{Al}_2\text{O}_3 \cdot d\text{B}_2\text{O}_3 \cdot e\text{P}_2\text{O}_5 : x\text{Eu}.y\text{Ln} \quad (1)$$

Wherein:

M is/are selected from Sr, Ca, Ba, and Mg, and any combinations thereof;

M' is/are selected from Sr, Ca, and Ba, and any combinations thereof;

Ln is/are selected from Nd, Dy, Ho, Tm, La, Ce, Er, Pr, Bi, and Sm, and any combinations thereof;

a, b, c, d, e, x and y are mole ratio and satisfy: $0.5 < a < 6.0$, $0.0001 \leq b \leq 2.0$, $0.5 \leq c \leq 9.0$, $0 \leq d \leq 1.0$, $0 \leq e \leq 1.0$, $0.00001 \leq x \leq 0.25$, $0.00001 \leq y \leq 0.3$, $0 \leq \beta \leq 1.0$, $0.5 < (a+b) \leq 6.0$, $0 < (d+e) \leq 1.0$.

According to a preferred embodiment of the present invention, it is provided a long afterglow luminescent material, wherein M in formula (1) is/are selected from Sr, Ca, and Mg, and any combinations thereof; M is/are selected from Sr, and Ca, and any combinations thereof; Ln is/are selected from Nd, Dy, Tm, La, Pr, Sm, and Ce, and any combinations thereof, wherein, after excited by a short wavelength light with a wavelength less than 500 nm, the material exhibits an emission spectrum between 420 and 650 nm with the peak at 440-620 mn and exhibits a luminescence color of blue purple, blue-green, yellow green, white, red etc. The material may have the characteristic of fast charge.

According to another preferred embodiment of the present invention, it is provided a long afterglow luminescent material, wherein e=0 in formula (1), and sulfur and/or selenium being introduced into the long afterglow luminescent material to partially replace oxygen in the lattice.

According to a further preferred embodiment of the present invention, it is provided a long afterglow luminescent material, wherein e≠0 in formula (1) and sulfur and/or selenium being introduced into the long afterglow luminescent material to partially replace oxygen in the lattice, at the same time phosphorus being optionally introduced as a constituent component as well as a dopant.

According to a further preferred embodiment of the present invention, it is provided a long afterglow luminescent material, wherein the mole ratios in formula (1) satisfy the following ranges: $0.5<a<6.0$, $0.0001 \leq b \leq 0.1$, $0.5 \leq c \leq 6.6$, $0 \leq d \leq 1.0$, $0 \leq e \leq 1.0$, $0.001 \leq x \leq 0.1$, $0.001 \leq y \leq 0.2$, $0 \leq \beta \leq 1.0$, wherein $0.5<(a+b) \leq 6.0$, $0<(d+e) \leq 1.0$, $(a+b)/c=0.8-1.2$; the amount (expressed in mole) of Sr is no less than 3.5 times as much as the sum of Ca and Mg; or the amount (expressed in mole) of Sr is no less than 3.5 times as much as that of Ca or Mg; the material exhibits yellow-green emission after excitation.

According to a further preferred embodiment of the present invention, it is provided a long afterglow luminescent material, wherein the mole ratios in formula (1) satisfy: $0.5<a<6.0$, $0.0001 \leq b \leq 0.1$, $0.75<c \leq 9.0$, $0 \leq d \leq 1.0$, $0 \leq e \leq 1.0$, $0.001 \leq x \leq 0.1$, $0.001 \leq y \leq 0.2$, $0 \leq \beta \leq 1.0$, wherein $0.5<(a+b) \leq 6.0$, $0<(d+e) \leq 1.0$, $c/(a+b)=1.5-1.9$; the long afterglow luminescence color of the material is blue-green after excitation.

According to a further preferred embodiment of the present invention, it is provided a long afterglow luminescent material, wherein the mole ratios in formula (1) satisfy: $0.5<a<6.0$, $0.0001 \leq b \leq 0.1$, $0.5 \leq c \leq 6.6$, $0 \leq d \leq 1.0$, $0 \leq e \leq 1.0$, $0.001 \leq x \leq 0.1$, $0.001 \leq y \leq 0.2$, $0 \leq \beta \leq 1.0$, wherein $0.5<(a+b) \leq 6.0$, $0<(d+e) \leq 1.0$, $(a+b)/c=0.8-1.2$; the amount (expressed in mole) of Ca is no less than 3.5 times as much as the sum of Sr and Mg; or the amount (expressed in mole) of Ca is no less than 3.5 times as much as that of Sr or Mg; the the material exhibits purple-blue luminescence after excitation.

According to a further preferred embodiment of the present invention, it is provided a long afterglow luminescent material, wherein the mole ratios in formula (1) satisfy: $0.5<a<6.0$, $0.0001 \leq b \leq 0.1$, $0.5 \leq c \leq 6.6$, $0 \leq d \leq 1.0$, $0 \leq e \leq 1.0$, $0.001 \leq x \leq 0.1$, $0.001 \leq y \leq 0.2$, $0 \leq \beta \leq 1.0$, wherein $0.5<(a+b) \leq 6.0$, $0<(d+e) \leq 1.0$, $(a+b)/c=0.9-1.1$; the ratio of the amount (expressed in mole) of Ca to that of Sr is between 0.6 and 1.5; the long afterglow luminescence color of the material is white after excitation.

According to a further preferred embodiment of the present invention, it is provided a long afterglow luminescent materials, wherein the mole ratios in formula (1) satisfy: $0.5<a<6.0$, $0.01 \leq b \leq 1.5$, $0.5 \leq c \leq 3.5$, $0 \leq d \leq 1.0$, $0 \leq e \leq 1.0$, $0.001 \leq x \leq 0.2$, $0.00001 \leq y \leq 0.2$, $0 \leq \beta \leq 1.0$, wherein $0.5<(a+b) \leq 6.0$, $0 \leq (d+e) \leq 1.0$, $(a+b)/c=2.0-3.3$; and the long afterglow luminescence color of the material is red after excitation.

According to a further preferred embodiment of the present invention, it is provided a long afterglow luminescent material, wherein the mole ratios in formula (1) satisfy: $0.01 \leq x \leq 0.25$, $0.01 \leq y \leq 0.3$; the material is also characterized by fast charge.

In the chemical composition of the long afterglow luminescent material of the present invention, the lattice sites of oxygen are partially replaced by sulfur and/or selenium, to form defects of sulfur and/or selenium in crystal, thereby the luminescence properties of the luminescent material and the performances of the products thereof can be greatly improved; phosphorus can partially replace aluminum and if phosphorus is used in combination with sulfur and/or selenium, the long afterglow material can be greatly improved in terms of luminescence properties, and powders of the luminescent material will be more loose and easy to be broken down so as to reduce the luminescence loss during grinding process.

In the preparation of the long afterglow luminescent material of the present invention, the compounds of the elements in formula (1) are used as raw materials, as for sulfur and/or selenium, element sulfur and/or element selenium may also be used as raw material, the mole ratios of the elements of the raw materials satisfy:

M: 0.5-6;
M': 0.0001-2.0;
S: 0.0001-2.0;
Se: 0.0001-2.0;
Al: 1.0-18;
B: 0-2.0;
P: 0-2.0
Eu: 0.00001-0.25;
Ln: 0.00001-0.3;

A high temperature solid-state reaction process was used in the preparation method of this invention. The raw materials of compounds of each element are weighted in mole ratios, ground and mixed homogeneously to produce a mixture, subsequently the mixture was placed into the crucible, then sintered at a temperature between 700 and 1100° C. for 2ÿ hours under oxidative atmosphere. After that it is sintered at a temperature between 1100 and 1550° C. for 2-30 hours under reducing atmosphere (the reducing atmosphere is an atmosphere comprising hydrogen, ammonia, a mixture of hydrogen and nitrogen, or in the presence of carbon particles, and the atmosphere may further comprise less than 10% hydrogen sulfide), depending on the capacity of the furnace, the weight, type and formulation of the charge materials.

The preparation method of this invention is a two-stage process comprising an oxidizing reaction stage and a reducing reaction stage. In such a method, the diffusion of rare earth activator ions in the long afterglow luminescent material and growth of the crystalline grain of long afterglow luminescent material are advantageously promoted. In addition, a reducing atmosphere comprising less than 10% hydrogen sulfide ($H_2S$) alleviates the volatilization of sulfur and/or selenium in the raw materials during high temperature reaction, thereby facilitating the preparation of the new aluminate long afterglow luminescence material comprising sulfur and/or selenium of the present invention.

In order to improve the quality of the materials, a small quantity (no more than 30wt % of the mixed materials) of other compounds, such as $NH_4Cl$, $NH_4F$, $(NH_4)_2HPO_4$, glucose, urea, $Li_2CO_3$, $SrF_2$, $CaF_2$ $CaSO_4$, SrS, CaS, $SrSO_4$, $SrHPO_4$ or $CaHPO_4$, may be added into the raw materials to participate in the solid-phase reaction. After sintering, the sintered mixture is cooled, pulverized, and sieved into factions of various particles depending on application requirements.

In the invention, the afterglow luminescence brightness and persisting time of samples can be measured with two types of methods: one is to test powdered samples, and the powder samples are tested for luminescence performance; the other is to make a luminescent film with powder samples, and the luminescent films are tested for luminescence performance.

In the method for testing powder sample, the sample is placed in a round vessel of 50 mm in diameter, 5 mm in depth, and kept in dark for more than 24 hours for extinction, then is taken out and exposed to a standard D65 light source under 1000 Lux illumination for excitation for 5 minutes, the luminescence intensity as a function of time is measured with a luminescence brightness measuring device equipped with a photomultiplier tube—marked as "routine test of powder sample" (As for rapid luminescent powder sample with fast charge under faint light, the sample is placed in a round vessel of 50 mm in diameter and 5 mm in depth, and kept the vessel in dark for no less than 24 hours for extinction, then taken out and exposed to a standard D65 light source under 25 Lux illumination for excitation for 15 minutes, the afterglow luminescence brightness as a function of time is measured with a luminescence brightness measuring device equipped with a photomultiplier tube—marked as "faint light test of powder sample"). While testing, a comparative sample of the prior art is excited under the same condition, and the afterglow brightness of the comparative sample is set as 100 so as to calculate the relative brightness of the samples.

The powder sample is fabricated into luminescent films, and subjected to the following test: the powder sample is uniformly mixed with a transparent resin in a ratio of 1:1 by weight to form a mixture, and the mixture is used to uniformly coat a plastic film with a coater to form a coating with a thickness of about 0.3±0.002 mm, and then the coating is dried and cut into discs with a diameter of 54 mm, the coating standard is set as 200 ±2gram luminescent powder per square meter. (In the examples hereafter, all the sample films are prepared in the same process, and conform to the same standard). The sample films are placed in dark for no less than 24 hours for extinction, then is taken out and exposed to a standard D65 light source under 1000 Lux illumination for excitation for 5 minutes, the afterglow luminescence brightness as a function of time is measured with a luminescence brightness measuring device equipped with a photomultiplier tube—marked as "routine test of film" (As for films made from rapid luminescent powders with fast charge under faint light, the films are kept in dark for no less than 24 hours for extinction, then taken out and exposed to a standard D65 light source under 25 Lux illumination for excitation for 15 minutes, the afterglow luminescence brightness as a function of time of the films is measured with a luminescence brightness measuring device equipped with a photomultiplier tube—marked as "faint light test of film"). While testing, a comparative sample film of the prior art is excited under the same condition, and the afterglow brightness of the comparative sample film is set as 100 so as to calculate the relative brightness of the sample films.

The samples of the examples of this invention and the comparative samples are prepared with powders made in accordance with the present invention and prior art respectively, the corresponding luminescent films are fabricated in accordance with the method for making the luminescent films as described above under the same condition. The powders and luminescent films of each sample are tested and measured with the methods for testing and measuring the corresponding powders and luminescent films as above described, the relative brightness values for all the samples are measured at the 10th minute after excitation is canceled. The excitation spectrum and emission spectrum of the materials were measured using F-4500 fluorescence spectrometer.

This invention provides a new system luminescent material with a new composite aluminate structure combining the fast charge property of the simple sulfide or oxysulfide system luminescent materials and the longer afterglow time of the simple aluminate system luminescent materials. Compared with various luminescent materials of the prior art, the new system luminescent material according to this invention has following prominent advantages:

1. The luminescence brightness and the afterglow time of the luminescent material powder is greatly improved, the luminescence of the luminescent material of this invention lasts no less than 90 hours before the brightness decreases to 0.3 mcd/m$^2$, as measured according to Germany luminescent material testing standard DIN67510;
2. The luminescent material according to this invention matches very well with organic materials, the luminescent products thereof show great improvements in luminescence intensity as well as in afterglow time;
3. The luminescent material according to this invention appears various luminescence colors, including purple-blue, blue-green, yellow-green, red and white etc.;
4. The luminescent material according to this invention has the property of fast charge, is capable of absorbing energy rapidly and maintaining luminescence with slow attenuation even under an illumination of 40 times lower than a normal light source;
5. The luminescent material according to this invention has broad excitation spectrum and emission spectrum, and can be used in broader application fields.

DETAILED DESCRIPTION OF THE PREFERRED EMBODIMENTS

Now the examples of the present invention will be described below, and the present invention is not limited by these examples. Sulfur (S) and selenium (Se) belong to the same group in periodic table, the both elements either in elemental form or as compound play the similar role on the long afterglow luminescent materials. Therefore only particular examples will be discussed, which by no means limits the application of sulfur (S) and selenium (Se) in the invention to the examples.

This invention involves a long afterglow luminescent material which has yellow-green luminescence, and the preparation method thereof. The present invention will be further explained with reference to Example 1-19.

EXAMPLE 1

| Raw material | Weight (g) |
| --- | --- |
| $SrCO_3$ | 147.63 |
| $Al_2O_3$ | 101.96 |
| $H_3BO_3$ | 2.47 |
| SrS | 0.24 |
| $(NH_4)_2HPO_4$ | 2.64 |
| $Eu_2O_3$ | 0.7 |

The raw materials of the above composition were ball-milled and mixed thoroughly, then placed in a crucible and put into an electric furnace, subsequently sintered in oxidizing atmosphere at 900° C. for 10 hours, the crucible was taken out after cooling. When the sintered product in the crucible was naturally cooled to room temperature, it was sintered in a furnace through which a mixture gas consisting of 95% hydrogen, 3% nitrogen and 2% hydrogen sulfide was passed, the furnace temperature was raised from 400° C. to 1400° C. over 10 hours, and kept at 1400° C. for 5 hours for sintering. Thereafter, the temperature in the furnace was dropped to 200° C. over 6 hours, and the crucible was taken out. After the sintered product in the crucible was naturally cooled to room temperature, it was pulverized, and ground by ball-milling, then luminescent particles were collected by sieving with a 325 mesh sieve, to obtain a luminescent material according to the present invention $SrO.0.002SrS.Al_2O_3.0.02B_2O_3.0.01P_2O_5:0.004Eu$. The material was labeled as Example 1.

EXAMPLE 1-7

The long afterglow luminescent materials with yellow-green luminescence color of Example 2-7 were prepared by the same method as in Example 1, and compared with the long afterglow luminescent material of Comparative Example A of the prior art ($SrO.Al_2O_3.0.02B_2O_3.0.004Eu$). The compositions of Example 1-7 are listed in Table 1. In Table 1 and the Tables of the following examples, the term "Comparative Example(s)" denote(s) the corresponding long afterglow luminescent materials prepared according to the prior art, and are abbreviated to "comparative sample". Table 1 shows the compositions of the luminescent materials and the relative brightness of corresponding luminescent powders and films at the 10th minute after excitation was canceled, relative to the luminescence lightness of the powder and luminescent film of Comparative Sample A which was set at 100.

Figure 1:
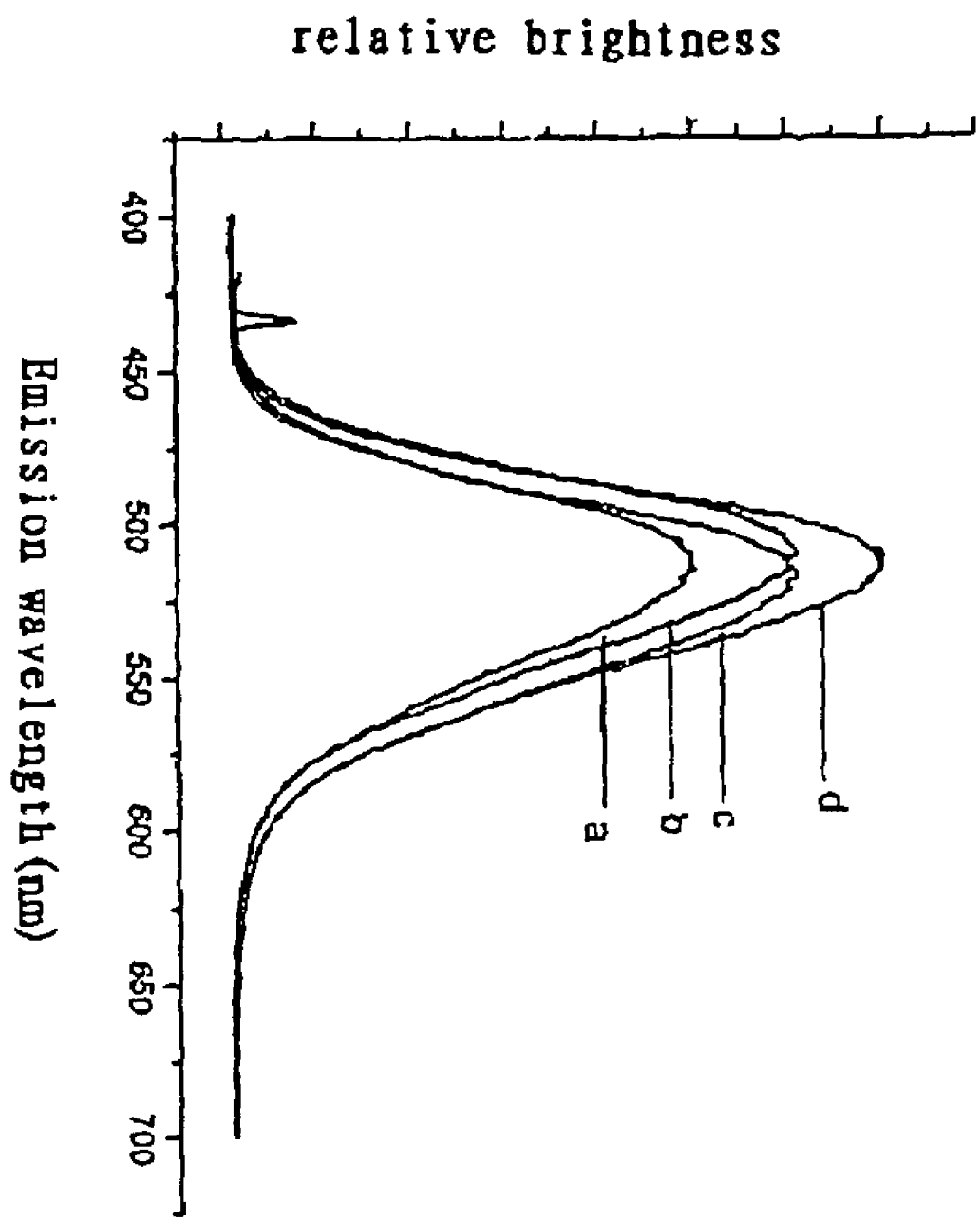
FIG. 1 the emission spectra of powders samples of Example 1, 5, 7 and Comparative Example A.
(a) $SrO.Al_2O_3.0.02B_2O_3$:0.004 Eu
(b) $SrO.0.003\ SrS.0.001\ SrSe.Al_2O_3.0.02\ B_2O_3$:0.004 Eu
(c) $SrO.0.005\ SrSe.Al_2O_3.0.02\ B_2O_3$:0.004 Eu
(d) $SrO.0.002\ SrS.Al_2O_3.0.02\ B_2O_3.0.01P_2O_5$:0.004 Eu FIG. 2 the luminescence brightness after excitation as a function of afterglow time of the luminescent powders samples of Example 10 and its corresponding comparative sample.
(a) $SrO.0.01\ SrS.Al_2O_3.0.05B_2O_3.0.1P_2O_5$: 0.005Eu.0.01Dy
(b) $SrO.Al_2O_3.0.05B_2O_3$:0.005 Eu.0.01Dy FIG. 3 the emission spectra of the luminescence powders samples of Example 27 and its corresponding comparative example.
(a) $4SrO.7Al_2O_3.0.3B_2O_3$:0.00001Eu.0.00001Dy
(b) $4SrO.0.005SrS.7Al_2O_3.0.3B_2O_3.0.02P_2O_5$:0.00001 Eu.0.00001Dy FIG. 4 the emission spectra of the luminescent film products of Example 44 and its corresponding comparative example.
(a) $CaO.Al_2O_3.0.05B_2O_3$:0.001Eu.0.0015Nd
(b) $CaO.0.01CaS.Al_2O_3.0.05B_2O_3.0.02P_2O_5$:0.001 Eu.0.0015Nd FIG. 5 the excitation spectrum of sample of Example 58.

FIG. 1 shows the emission spectra of the luminescent powders of Example 1, 5, 7 and Comparative Sample A, the y-axis represents the relative brightness. It can be seen from Table 1 and FIG. 1, the new composite aluminate material according to this invention had a slightly red shifted peak of the emission spectrum, and greatly enhanced luminescence brightness, especially the matching property with organic materials was substantially improved, compared with the yellow-green long afterglow luminescent material of the prior art.

TABLE 1

| Example No. | Composition of Examples | Relative brightness of powder | Relative brightness of luminescent film |
| --- | --- | --- | --- |
| 1 | $SrO•0.002SrS•Al_2O_3•0.02B_2O_3•0.01P_2O_5:0.004Eu$ | 128 | 130 |
| 2 | $SrO•0.01SrS•Al_2O_3•0.02B_2O_3•0.1P_2O_5:0.004Eu$ | 136 | 138 |
| 3 | $SrO•0.0001SrSe•Al_2O_3•0.02B_2O_3•0.005P_2O_5:0.004Eu$ | 108 | 114 |
| 4 | $SrO•0.001SrS•0.0005SrSe•Al_2O_3•0.02B_2O_3•0.5P_2O_5:0.004Eu$ | 122 | 128 |
| 5 | $SrO•0.005SrSe•Al_2O_3•0.02B_2O_3:0.004Eu$ | 121 | 126 |
| 6 | $SrO•0.2SrS•Al_2O_3•0.02B_2O_3:0.004Eu$ | 103 | 113 |
| 7 | $SrO•0.003SrS•0.001SrSe•Al_2O_3•0.02B_2O_3:0.004Eu$ | 112 | 118 |
| Comparative sample A | $SrO•Al_2O_3•0.02B_2O_3:0.004Eu$ | 100 | 100 |

EXAMPLE 8-12

The long afterglow luminescent materials with different amounts (expressed in mole) of europium and dysprosium of Example 8-12 were prepared by the same process as in Example 1, the corresponding comparative samples were prepared according to prior art, and the luminescence brightness of these luminescent powders and films at the 10th minute after excitation was canceled was measured with the same methods of routine testing of powder and routine testing of film. Each of the examples and comparative samples as well as the results of their relative brightness are listed in Table 2. The effect of adding different amounts of europium and dysprosium on long afterglow luminescent materials was well know in the art, which would render the powders and luminescent films of long afterglow luminescent materials different brightness. In the present invention, a new composite aluminate structure was formed by addition of sulfur and/or selenium or addition of sulfur and/or selenium together with phosphorus, exhibiting relative brightness higher than that of the comparative samples prepared according to prior art.

Figure 2:
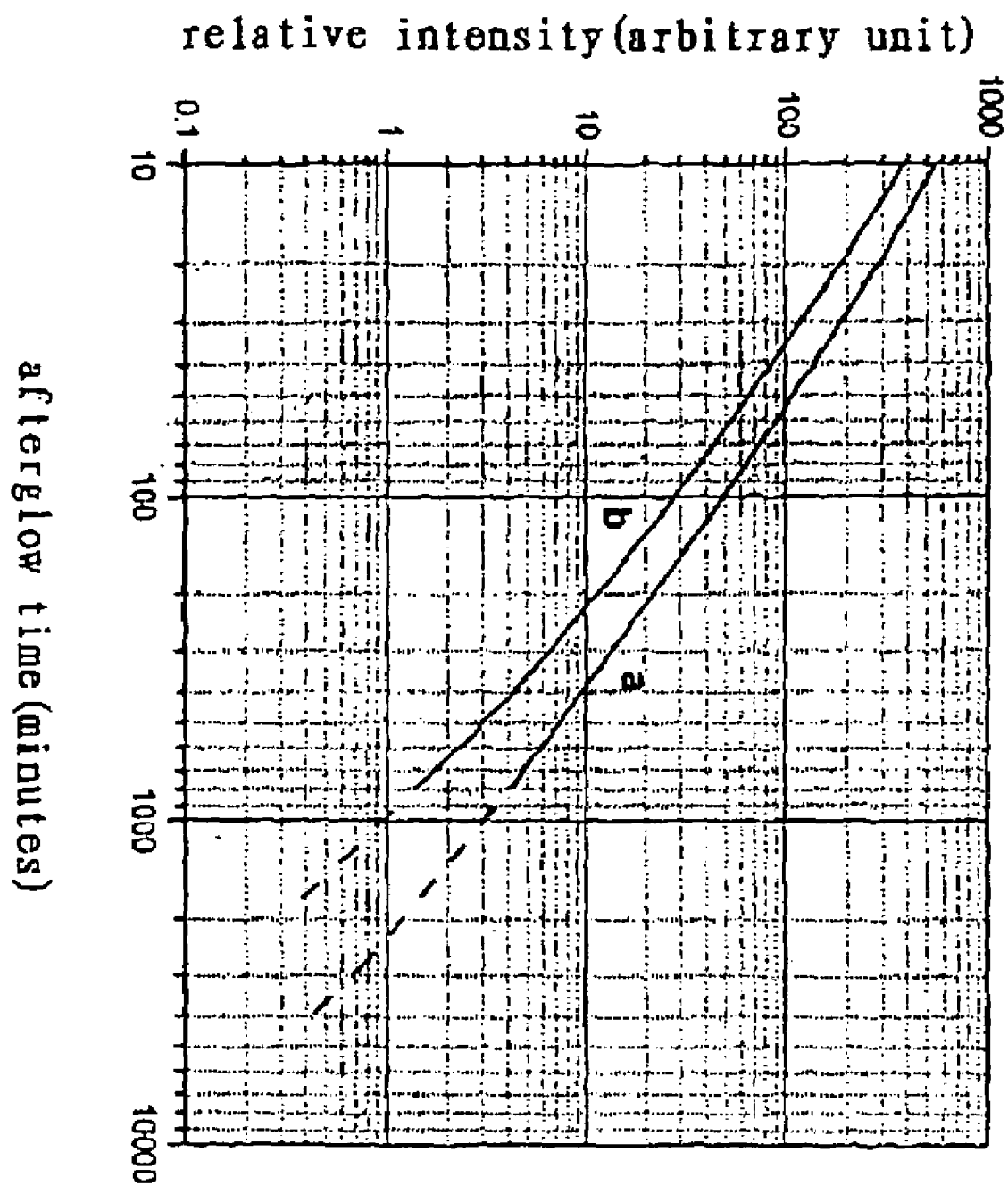

FIG. 2 shows the luminescence brightness after excitation as a function of afterglow time of the luminescent powder of Example 10 in comparison with its corresponding comparative sample. From FIG. 2, it can be seen that the luminescence performance over prolonged time of the luminescent material of Example 10 was much better than its Comparative sample. Moreover, the slower attenuation in luminescence was more prominent with time. When the afterglow time of the material of Example 10 was up to 70 hours before the luminescence reduced to a brightness of 0.3 mcd/m$^2$.

TABLE 2

| Example No. | Composition of Examples | Relative brightness of powder | Relatives of brightness luminescent film |
|---|---|---|---|
| 8 | $SrO \cdot 0.005SrS \cdot Al_2O_3 \cdot 0.05B_2O_3 : 0.00001Eu \cdot 0.00001Dy$ | 119 | 122 |
| Comparative sample 8 | $SrO \cdot Al_2O_3 \cdot 0.05B_2O_3 : 0.00001Eu \cdot 0.00001Dy$ | 100 | 100 |
| 9 | $SrO \cdot 0.005CaS \cdot 0.005SrSe \cdot Al_2O_3 \cdot 0.05B_2O_3 : 0.0001Eu \cdot 0.0015Dy$ | 125 | 131 |
| Comparative sample 9 | $SrO \cdot Al_2O_3 \cdot 0.05B_2O_3 : 0.0001Eu \cdot 0.0015Dy$ | 100 | 100 |
| 10 | $SrO \cdot 0.01SrS \cdot Al_2O_3 \cdot 0.05B_2O_3 \cdot 0.1P_2O_5 : 0.005Eu \cdot 0.01Dy$ | 131 | 138 |
| Comparative sample 10 | $SrO \cdot Al_2O_3 \cdot 0.05B_2O_3 : 0.005Eu \cdot 0.01Dy$ | 100 | 100 |
| 11 | $SrO \cdot 0.001CaSe \cdot Al_2O_3 \cdot 0.05B_2O_3 : 0.01Eu \cdot 0.005Dy$ | 111 | 116 |
| Comparative sample 11 | $SrO \cdot Al_2O_3 \cdot 0.05B_2O_3 : 0.01Eu \cdot 0.005Dy$ | 100 | 100 |
| 12 | $SrO \cdot 0.1SrS \cdot 0.001SrSe \cdot Al_2O_3 \cdot 0.005B_2O_3 \cdot 0.01P_2O_5 : 0.15Eu \cdot 0.2Dy$ | 103 | 105 |
| Comparative sample 12 | $SrO \cdot Al_2O_3 \cdot 0.05B_2O_3 : 0.15Eu \cdot 0.2Dy$ | 100 | 100 |

EXAMPLE 13-19

The long afterglow luminescent materials of Example 13-19 with europium as activator and different amount (expressed in mole) of other elements such as Nd, Dy, Ho, Tm, La, Ce, Er, Pr, Bi, Sm as co-activators, were prepared by the same method as in Example 1, the corresponding comparative samples were prepared according to prior art. The luminescence brightness of these luminescent powders and films was measured at the 10th minute after excitation was canceled. Each Example sample and Comparative sample as well as the results of their relative brightness are listed in Table 3. (While in following examples, it should be appreciated the combination of the activators and co-activators would not be limited to the above).

TABLE 3

| Example No. | Composition of Examples | Relative brightness of powder | Relative lightness of luminescent film |
|---|---|---|---|
| 13 | $0.6BaO \cdot 0.02SrS \cdot 0.5Al_2O_3 \cdot 0.02B_2O_3 \cdot 0.01P_2O_5 : 0.005Eu \cdot 0.004Dy \cdot 0.0005Nd$ | 121 | 121 |
| Comparative sample 13 | $0.6BaO \cdot 0.5Al_2O_3 \cdot 0.02B_2O_3 : 0.005Eu \cdot 0.004Dy \cdot 0.0005Nd$ | 100 | 100 |
| 14 | $(Sr_{0.8}Ca_{0.2})O \cdot 0.0002CaS \cdot 0.0002SrSe \cdot Al_2O_3 \cdot 0.05B_2O_3 : 0.005Eu \cdot 0.0005Ho$ | 110 | 113 |
| Comparative sample 14 | $(Sr_{0.8}Ca_{0.2})O \cdot Al_2O_3 \cdot 0.05B_2O_3 : 0.005Eu \cdot 0.0005Ho$ | 100 | 100 |
| 15 | $(Sr_{0.9}Mg_{0.1})O \cdot 0.05SrS \cdot Al2O3 \cdot 0.05B2O3 : 0.005Eu \cdot 0.0005Tm$ | 120 | 125 |
| Comparative sample 15 | $(0.95SrO \cdot 0.1MgO)Al_2O_3 \cdot 0.05B_2O_3 : 0.005Eu \cdot 0.0005Tm$ | 100 | 100 |

TABLE 3-continued

| Example No. | Composition of Examples | Relative brightness of powder | Relative lightness of luminescent film |
|---|---|---|---|
| 16 | $1.8SrO \cdot 0.1SrS \cdot 2.0Al_2O_3 \cdot 0.08B_2O_3:0.005Eu \cdot 0.0005La$ | 120 | 122 |
| Comparative sample 16 | $1.9SrO \cdot 2.0Al_2O_3 \cdot 0.08B_2O_3:0.005Eu \cdot 0.0005La$ | 100 | 100 |
| 17 | $2.8SrO \cdot 0.01CaS \cdot 3.0Al_2O_3 \cdot 0.3B_2O_3 \cdot 0.2P_2O_5:0.005Eu \cdot 0.0005Er$ | 127 | 131 |
| Comparative sample 17 | $(2.8SrO \cdot 0.01CaO) \cdot 3.0Al_2O_3 \cdot 0.3B_2O_3:0.005Eu \cdot 0.0005Er$ | 100 | 100 |
| 18 | $(Sr_{0.8}Ca_{0.1}Mg_{0.1})O \cdot 0.0015SrS \cdot 0.0015SrSe \cdot Al_2O_3 \cdot 0.04B_2O_3 \cdot 0.02P_2O_5:0.005Eu \cdot 0.004La \cdot 0.0005Sm$ | 127 | 133 |
| Comparative sample 18 | $(Sr_{0.8}Ca_{0.1}Mg_{0.1})O \cdot Al_2O_3 \cdot 0.04B_2O_3:0.005Eu \cdot 0.004La \cdot 0.0005Sm$ | 100 | 100 |
| 19 | $2SrO \cdot 0.0002CaSe \cdot 2Al_2O_3 \cdot 1.0P_2O_5:0.015Eu \cdot 0.004Dy \cdot 0.0005Ce$ | 106 | 108 |
| Comparative sample 19 | $2SrO \cdot 2Al_2O_3 \cdot 0.1B_2O_3:0.015Eu \cdot 0.004Dy \cdot 0.0005Ce$ | 100 | 100 |

The present invention also involves a long afterglow luminescent material with blue-green luminescence and preparation method thereof. Hereinafter the invention will be described with reference to Example 20-40.

EXAMPLE 20

| Raw material | Weight (g) |
|---|---|
| $SrCO_3$ | 590.52 |
| $Al_2O_3$ | 713.72 |
| $H_3BO_3$ | 12.37 |
| SrS | 0.6 |
| $(NH_4)_2HPO_4$ | 1.32 |
| $Eu_2O_3$ | 1.41 |

The raw materials of the above composition were ball-milled and mixed thoroughly, then charged into a crucible and put into an electric furnace, and sintered in oxidizing atmosphere at 1000° C. for 20 hours. The crucible was taken out after cooling, and the sintered product in the crucible was naturally cooled to room temperature, and then the product was sintered in a furnace through which a mixture gas consisting of 54% hydrogen, 41% nitrogen and 5% hydrogen sulfide was passed, the furnace temperature was raised from 400° C. to 1550° C. over 18 hours, and kept at 1550° C. for 8 hours for sintering. Thereafter, the furnace temperature was dropped to 200° C. over 6 hours, and the crucible was taken out. The sintered product in the crucible was naturally cooled to room temperature, and then pulverized, and ground by ball-milling, and sieved with a 325 mesh sieve, to give a luminescent material of the present invention $4SrO.0.005SrS.7Al_2O_3.0.1B_2O_3.\ 0.001P_2O_5:0.008Eu$. The material was labeled as Example 20.

EXAMPLE 20-26

The long afterglow luminescent materials with blue-green luminescence color of Example 21-26 were prepared by the same method as in Example 20, and comparing with the long afterglow luminescent material of Comparative Sample B of prior art ($4SrO.7Al_2O_3\ 0.1B_2O_3:0.008Eu$). The compositions of Example 20-26 are listed in Table 4. The luminescence brightness at 10 minutes after excitation of the luminescence powders and films was measured using the same testing method as described above. Each of the examples and comparative samples as well as the results of their relative brightness are listed in Table 4.

From Table 4, it can be clear that a long afterglow luminescence material with blue-green luminescence can be prepared according to this invention, and a long afterglow luminescence material with higher brightness than the material prepared according to prior art can be obtained.

TABLE 4

| Example No. | Composition of Examples | Relative brightness of powder | Relative brightness of luminescent film |
|---|---|---|---|
| 20 | $4SrO \cdot 0.005SrS \cdot 7Al_2O_3 \cdot 0.1B_2O_3 \cdot 0.01P_2O_5:0.008Eu$ | 126 | 131 |
| 21 | $4SrO \cdot 0.2SrS \cdot 7Al_2O_3 \cdot 0.1B_2O_3 \cdot 0.02P_2O_5:0.008Eu$ | 102 | 105 |
| 22 | $4SrO \cdot 0.005SrS \cdot 7Al_2O_3 \cdot 0.1B_2O_3 \cdot 0.005P_2O_5:0.008Eu$ | 139 | 144 |
| 23 | $4SrO \cdot 0.0001CaSe \cdot 7Al_2O_3 \cdot 0.9P_2O_5:0.008Eu$ | 103 | 105 |
| 24 | $4SrO \cdot 0.005SrSe \cdot 7Al_2O_3 \cdot 0.1B_2O_3:0.008Eu$ | 122 | 123 |
| 25 | $4SrO \cdot 007SrS \cdot 0.003SrSe \cdot 7Al_2O_3 \cdot 0.1B_2O_3:0.008Eu$ | 113 | 116 |
| 26 | $4SrO \cdot 0.007CaS \cdot 0.003CaSe \cdot 7Al_2O_3 \cdot 0.1B_2O_3 \cdot 0.5P_2O_5:0.008Eu$ | 119 | 119 |
| Comparative sample B | $4SrO \cdot 7Al_2O_3 \cdot 0.1B_2O_3:0.008Eu$ | 100 | 100 |

EXAMPLE 27-35

The long afterglow luminescent materials with different amounts (expressed in mole) of europium and dysprosium of Example 27-35 were prepared by the same method as in Example 20, the corresponding comparative samples were prepared according to prior art, and the luminescence brightness of these luminescent powders and films at the 10th minute after excitation was canceled was measured. Each of the examples and comparative samples as well as the results of their relative brightness are listed in Table 5.

Figure 3:
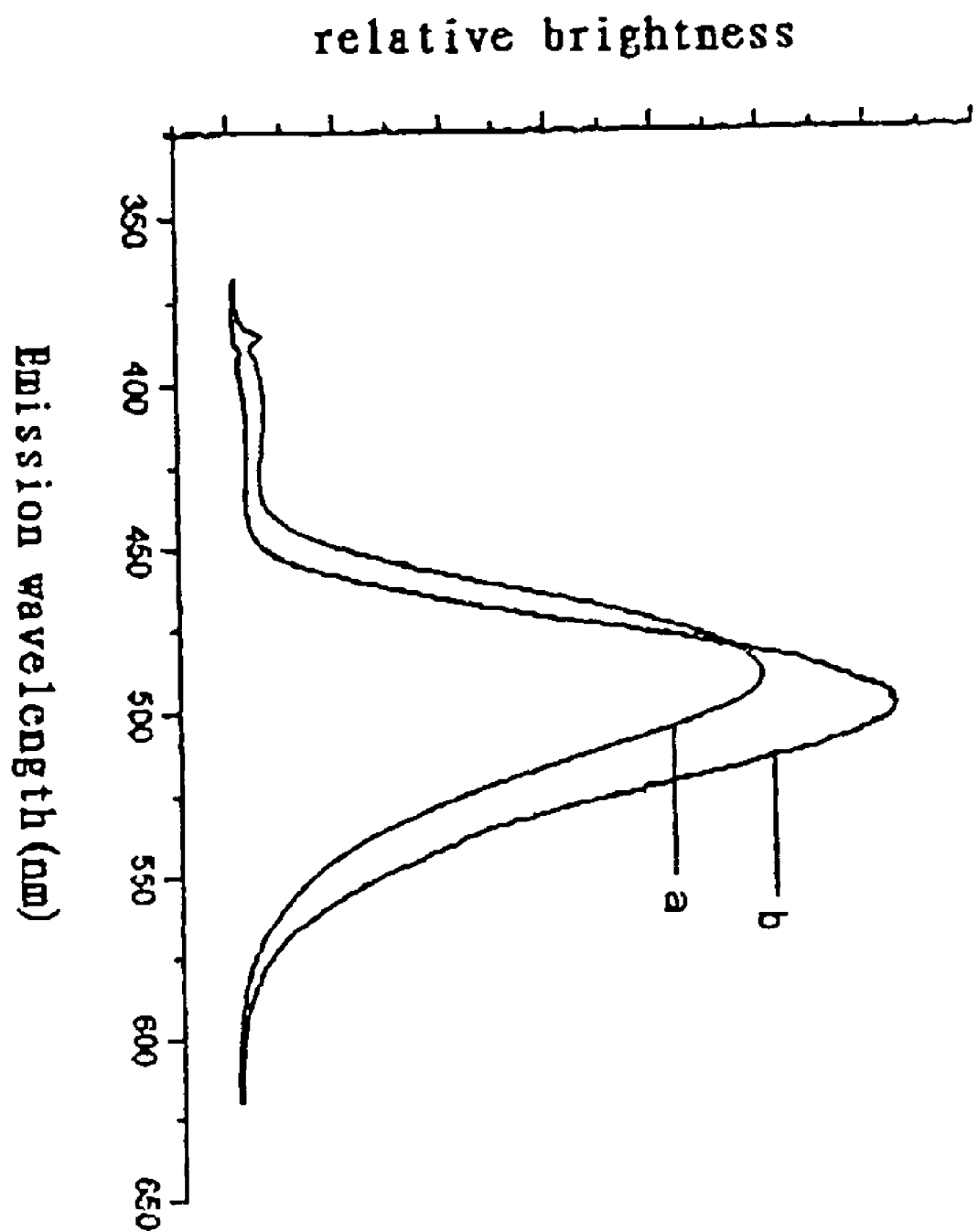

FIG. 3 shows the emission spectra of the luminescence powder of Example 27 and its corresponding comparative sample. From the emission spectra, one can see that by solely adding sulfide, the emission wave length of the emission spectrum of the blue-green luminescence material of Example 27 was slightly red shifted compared to the comparative sample, without substantial change in luminescence color. While it can be clearly concluded that the luminescence intensity was greatly enhanced from the comparison of the relative brightness in the emission spectra and the comparison of the relative brightness of powders and films.

TABLE 5

| Example No. | Composition of Examples | Relative brightness of powder | Relativess of brightness luminescent film |
|---|---|---|---|
| 27 | $4SrO \cdot 0.005SrS \cdot 7Al_2O_3 \cdot 0.3B_2O_3 \cdot 0.02P_2O_5 : 0.00001Eu \cdot 0.00001Dy$ | 120 | 123 |
| Comparative sample 27 | $4SrO \cdot 7Al_2O_3 \cdot 0.3B_2O_3 : 0.00001Eu \cdot 0.00001Dy$ | 100 | 100 |
| 28 | $5.8SrO \cdot 0.01SrS \cdot 9Al_2O_3 \cdot 0.5B_2O_3 : 0.0001Eu \cdot 0.0015Dy$ | 116 | 121 |
| Comparative sample 28 | $5.8SrO \cdot 9Al_2O_3 \cdot 0.5B_2O_3 : 0.0001\ Eu \cdot 0.0015Dy$ | 100 | 100 |
| 29 | $4SrO \cdot 0.0005SrSe \cdot 7Al_2O_3 \cdot 0.4B_2O_3 \cdot 0.1P_2O_5 : 0.001Eu \cdot 0.001Dy$ | 123 | 125 |
| Comparative sample 29 | $4SrO \cdot 7Al_2O_3 \cdot 0.4B_2O_3 : 0.001Eu \cdot 0.001Dy$ | 100 | 100 |
| 30 | $3.5SrO \cdot 0.02SrS \cdot 0.002SrSe \cdot 5.6Al_2O_3 \cdot 0.35B_2O_3 \cdot 0.005P_2O_5 : 0.01Eu \cdot 0.01Dy$ | 117 | 119 |
| Comparative sample 30 | $3.5SrO \cdot 5.6Al_2O_3 \cdot 0.35B_2O_3 : 0.01Eu \cdot 0.01Dy$ | 100 | 100 |
| 31 | $4SrO \cdot 0.002SrSe \cdot 7Al_2O_3 \cdot 0.15B_2O_3 : 0.15\ Eu \cdot 0.2Dy$ | 107 | 110 |
| Comparative sample 31 | $4SrO \cdot 7Al_2O_3 \cdot 0.15B_2O_3 : 0.15\ Eu \cdot 0.2Dy$ | 100 | 100 |

EXAMPLE 32-40

The long afterglow luminescent materials of Example 32-40, comprising europium as activator and different amount (expressed in mole) of other elements such as Nd, Dy, Ho, Tm, La, Ce, Er, Pr, Bi, Sm as co-activators, were prepared by the same method as in Example 20, the corresponding comparative samples were prepared according to prior art, and the luminescence brightness at the 10th minute after excitation was canceled of these luminescent powders and films was measured with the same method as describe above. The compositions of each example and comparative sample as well as the results of their relative brightness are listed in Table 6. From these results one can see that, the addition of different amounts of co-activators into the composite aluminates which were doped with sulfur and/or selenium or with sulfur and/or selenium in combination with phosphorus, resulted in improvements of various degrees of the luminescence brightness of the luminescent powders and the corresponding films thereof, so that the relative brightness of the luminescent powders and films of each example were substantially enhanced. (While in following examples, it should be appreciated the combination of activators and co-activators would not be limited to the above).

TABLE 6

| Example No. | Composition of Examples | Relative brightness of powder | Relative lightness of luminescent film |
|---|---|---|---|
| 32 | $0.6SrO \cdot 0.015SrS \cdot 0.92Al_2O_3 \cdot 0.01B_2O_3 : 0.005Eu \cdot 0.0005Nd$ | 106 | 107 |
| Comparative sample 32 | $0.6SrO \cdot 0.92Al_2O_3 \cdot 0.01B_2O_3 : 0.005Eu \cdot 0.0005Nd$ | 100 | 100 |

TABLE 6-continued

| Example No. | Composition of Examples | Relative brightness of powder | Relative lightness of luminescent film |
|---|---|---|---|
| 33 | 4.2SrO•05SrS•7Al$_2$O$_3$•0.5B$_2$O$_3$•0.05P$_2$O$_5$:0.005Eu•0.004Dy•0.0005 Nd | 115 | 118 |
| Comparative sample 33 | 4.2SrO•7Al$_2$O$_3$•0.5B$_2$O$_3$:0.005Eu•0.004Dy•0.0005Nd | 100 | 100 |
| 34 | (2.6SrO•0.3CaO)•0.001SrSe•0.001SrS•5Al$_2$O$_3$•0.4B$_2$O$_3$•0.1P$_2$O$_5$:0.005Eu•0.004Dy•0.0005Ho | 125 | 128 |
| Comparative sample 34 | (2.6SrO•0.3CaO)•5Al$_2$O$_3$•0.4B$_2$O$_3$: 0.005Eu•0.004Dy•0.0005Ho | 100 | 100 |
| 35 | (3.4SrO•0.1MgO)•0.04SrS•0.02CaS•6Al$_2$O$_3$•0.2B$_2$O$_3$:0.005Eu•0.004Dy•0.0005Tm | 110 | 109 |
| Comparative sample 35 | (3.44SrO•0.1MgO•0.02CaO)•6Al$_2$O$_3$•0.2B$_2$O$_3$:0.005Eu•0.004Dy•0.0005Tm | 100 | 100 |
| 36 | 3.7SrO•0.1SrS•5.8Al$_2$O$_3$•0.4B$_2$O$_3$•0.1P$_2$O$_5$:0.005Eu•0.004Dy•0.0005La | 98 | 103 |
| Comparative sample 36 | 3.7SrO•5.8Al$_2$O$_3$•0.4B$_2$O$_3$:0.005Eu•0.004Dy•0.0005La | 100 | 100 |
| 37 | 4.36SrO•0.2SrS•8.0Al$_2$O$_3$•0.8B$_2$O$_3$•0.02P$_2$O$_5$:0.005Eu•0.004Dy•0.0005Er | 100 | 103 |
| Comparative sample 37 | 4.56SrO•8.0Al$_2$O$_3$•0.8B$_2$O$_3$:0.005Eu•0.004Dy•0.0005Er | 100 | 100 |
| 38 | (3.8SrO•0.1CaO•0.1MgO)•0.001SrSe•0.02CaS•7Al$_2$O$_3$•0.4B$_2$O$_3$:0.005Eu•0.004Dy•0.0005Sm | 115 | 120 |
| Comparative sample 38 | (3.8SrO•0.1CaO•0.1MgO)•7Al$_2$O$_3$•0.4B$_2$O$_3$:0.005Eu•0.004Dy•0.0005Sm | 100 | 100 |
| 39 | 3.7SrO•0.07CaSe•7Al$_2$O$_3$•0.5B$_2$O$_3$•0.5P$_2$O$_5$:0.005Eu•0.004Dy•0.0005Ce | 108 | 109 |
| Comparative sample 39 | (3.7SrO•0.07CaO)•7Al$_2$O$_3$•0.5B$_2$O$_3$:0.005Eu•0.004Dy•0.0005Ce | 100 | 100 |
| 40 | 4SrO•0.02SrS•7.05Al$_2$O$_3$•0.45B$_2$O$_3$•0.05P$_2$O$_5$:0.005Eu•0.005Nd•0.004Pr | 130 | 133 |
| Comparative sample 40 | 4SrO•7.05Al$_2$O$_3$•0.45B$_2$O$_3$:0.005Eu•0.005Nd•0.004Pr | 100 | 100 |

The present invention also involves a long afterglow luminescent material with purple-blue luminescence color and the preparation method thereof. Hereinafter it will be described with reference to Example 41-54.

EXAMPLE 41

| Raw material | Weight (g) |
|---|---|
| CaCO$_3$ | 100 |
| Al$_2$O$_3$ | 101.96 |
| H$_3$BO$_3$ | 2.47 |
| CaS | 0.36 |
| (NH$_4$)$_2$HPO$_4$ | 1.32 |
| Eu$_2$O$_3$ | 0.88 |

The raw materials of the above composition were ball-milled and mixed thoroughly, then charged into a crucible and put into an electric furnace, subsequently sintered in oxidizing atmosphere at 700° C. for 10 hours, the crucible was taken out after cooling. The sintered product in the crucible was naturally cooled to room temperature, and then was sintered in a furnace through which a mixture gas consisting of 95% hydrogen, 3% nitrogen and 2% hydrogen sulfide was passed, the furnace temperature was raised from 400° C. to 1300° C. over 10 hours, and kept at 1300° C. for 5 hours for sintering. Thereafter, the furnace temperature was dropped to 200° C. over 6 hours, and the crucible was taken out, the sintered product in the crucible was naturally cooled to room temperature, and then pulverized, and ground by ball-milling, sieved with a 250 mesh screen to give a luminescent material according to the present invention CaO.0.005CaS.Al$_2$O$_3$.0.02B$_2$O$_3$. 0.005P$_2$O$_5$:0.005Eu. The material was labeled as Example 41.

EXAMPLE 41-43

The long afterglow luminescent materials with purple-blue luminescence color of Example 42-43 were prepared by the same method as in Example 41, and the long afterglow luminescent material of Comparative sample C was prepared according to prior art (CaO.Al$_2$O$_3$.0.02B$_2$O$_3$:0.005Eu). The luminescent powders and films of examples and comparative samples were measured with the methods for routine testing of powder and routine testing of film respectively. The compositions and testing results of examples and the comparative sample are listed in Table 7.

From Table 7, one can see that a long afterglow luminescence material with purple-blue luminescence color can be prepared according to this invention. Due to the new composite aluminate structure, the luminescence brightness of the long afterglow luminescence material with purple-blue luminescence color prepared according to this invention was substantially enhanced, and the products thereof was featured by higher brightness, as compared with the material prepared according to prior art.

TABLE 7

| Example No. | Composition of Examples | Relative brightness of powder | Relative brightness of luminescent film |
|---|---|---|---|
| 41 | CaO•0.005CaS•Al$_2$O$_3$•0.02B$_2$O$_3$•0.005P$_2$O$_5$:0.005Eu | 139 | 143 |
| 42 | CaO•0.005CaS•0.002CaSe•Al$_2$O$_3$•0.02B$_2$O$_3$:0.005Eu | 120 | 122 |

TABLE 7-continued

| Example No. | Composition of Examples | Relative brightness of powder | Relative brightness of luminescent film |
|---|---|---|---|
| 43 | CaO•0.002CaSe•$Al_2O_3$•0.02$B_2O_3$•0.01$P_2O_5$:0.005Eu | 120 | 123 |
| Comparative sample C | CaO•$Al_2O_3$•0.02$B_2O_3$:0.005Eu | 100 | 100 |

EXAMPLE 44-46

The long afterglow luminescent materials with different amounts (expressed in mole) of europium and dysprosium of Example 44-46 were prepared by the same method as in Example 41, the corresponding comparative samples were prepared according to prior art, and the luminescence brightness at the 10th minute after excitation was canceled of these luminescent powders and films was measured by the same method as described above. The compositions of each example and comparative sample as well as the results of their relative brightness are listed in Table 8.

Figure 4:
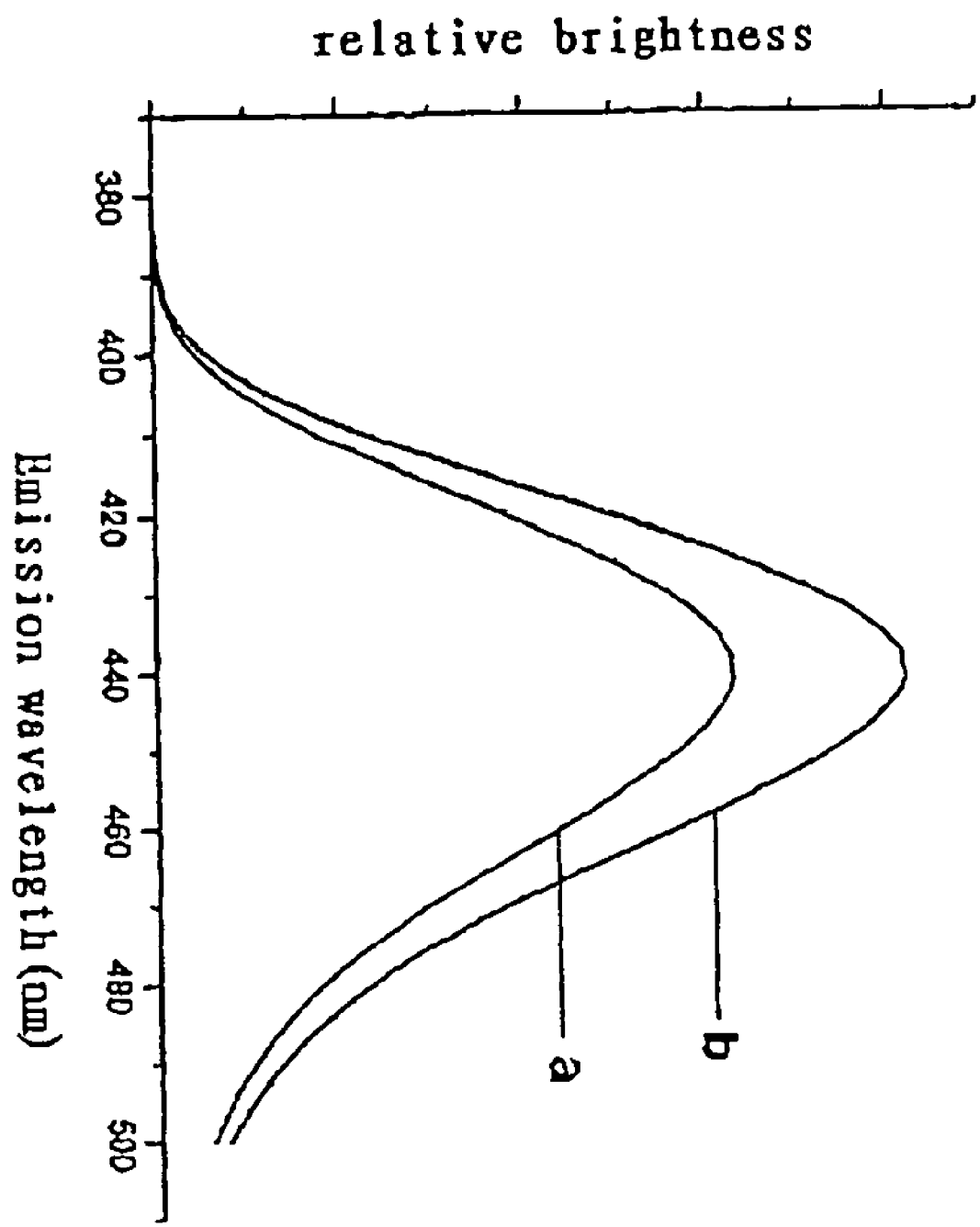
Figure 5:
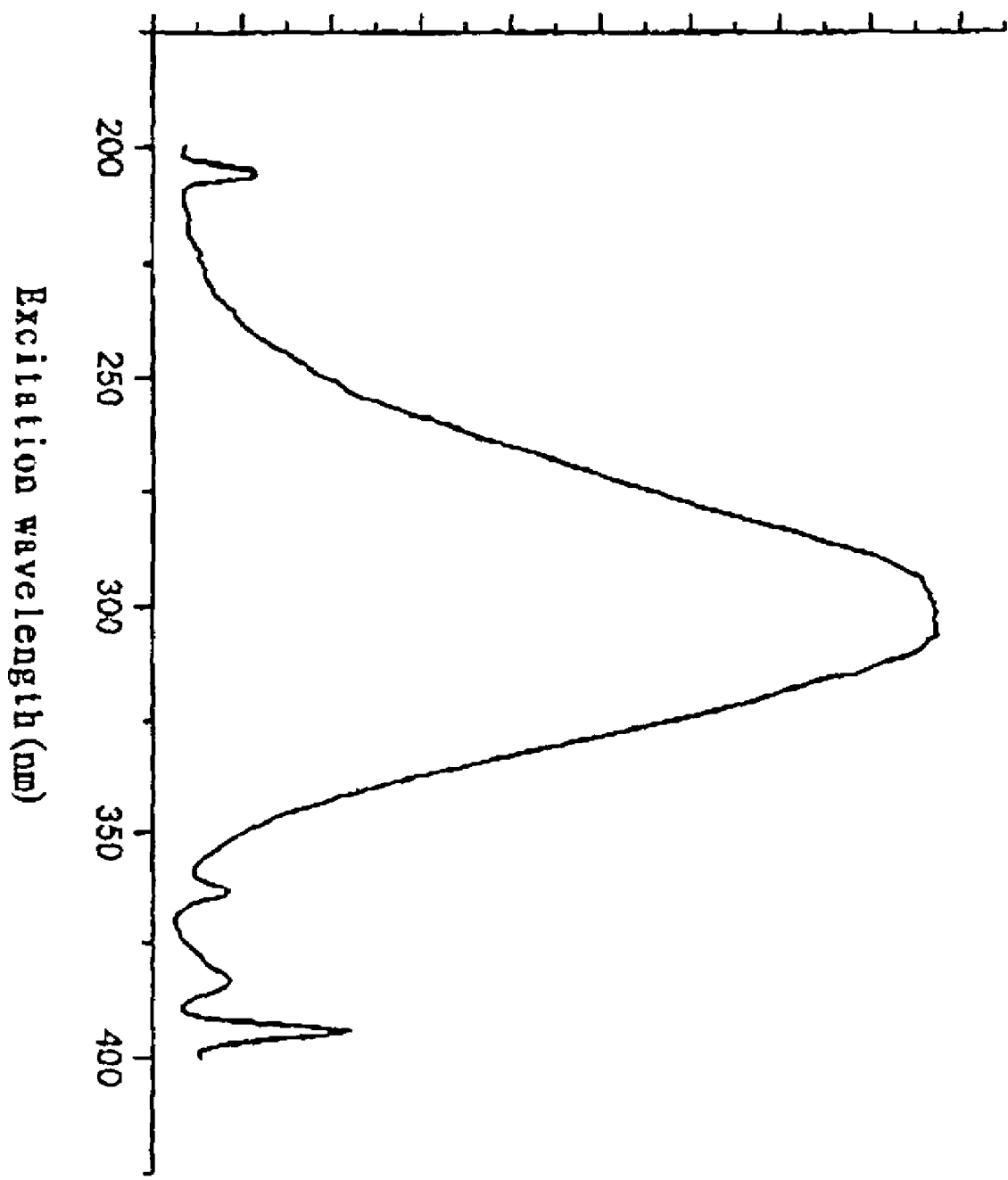

FIG. 4 shows the comparison of emission spectrum of a luminescent film product of Example 44 with that of the corresponding comparative example. By analyzing, one can conclude from FIG. 4, the long afterglow luminescent material of the new system according to this invention could be fabricated into products with higher luminescence intensity compared with the prior art long afterglow luminescent material with purple luminescence color.

TABLE 8

| Example No. | Composition of Examples | Relative brightness of powder | Relative tness of brightness luminescent film |
|---|---|---|---|
| 44 | CaO•0.01CaS•$Al_2O_3$•0.05$B_2O_3$•0.02$P_2O_5$:0.001Eu,0.0015Nd | 127 | 130 |
| Comparative sample 44 | CaO•$Al_2O_3$•0.05$B_2O_3$:0.001Eu,0.0015Nd | 100 | 100 |
| 45 | CaO•0.005CaS•0.002SrSe•$Al_2O_3$•0.01$B_2O_3$•0.01$P_2O_5$:0.001Eu,0.0015Nd | 134 | 135 |
| Comparative sample 45 | CaO•$Al_2O_3$•0.01$B_2O_3$:0.001Eu,0.0015Nd | 100 | 100 |
| 46 | CaO•0.001CaS•$Al_2O_3$•0.01$B_2O_3$:0.01Eu,0.01Nd | 118 | 121 |
| Comparative sample 46 | CaO•$Al_2O_3$•0.01$B_2O_3$:0.01Eu,0.02Nd | 100 | 100 |

EXAMPLE 47-54

The long afterglow luminescent materials of Example 47-54, comprising europium as activator and different amounts (expressed in mole) of other elements such as Nd, Dy, Ho, Tm, La, Ce, Er, Pr, Bi, Sm as co-activators, were prepared by the same method as in Example 41, the corresponding Comparative samples were prepared according to prior art, and the luminescence brightness at the 10th minute after excitation was canceled of these luminescent powders and films was measured with the same method as described above. The compositions of each example and comparative sample as well as the results of their relative brightness are listed in Table 9.

TABLE 9

| Example No. | Composition of Examples | Relative brightness of powder | Relative lightness of luminescent film |
|---|---|---|---|
| 47 | 0.7CaO•0.003CaS•0.8$Al_2O_3$•0.015$B_2O_3$:0.0001Eu•0.0015Nd•0.004Pr | 119 | 121 |
| Comparative sample 47 | 0.7CaO•0.8$Al_2O_3$•0.015$B_2O_3$:0.0001Eu•0.0015Nd•0.004Pr | 100 | 100 |
| 48 | $(Ca_{0.9}Sr_{0.1})$O•0.002CaSe.$Al_2O_3$•0.03$B_2O_3$•0.1$P_2O_5$:0.001Eu•0.001Nd•0.0005Ho | 116 | 117 |
| Comparative sample 48 | $(Ca_{0.9}Sr_{0.1})$O•$Al_2O_3$•0.03$B_2O_3$:0.001Eu•0.001Nd•0.0005Ho | 100 | 100 |

TABLE 9-continued

| Example No. | Composition of Examples | Relative brightness of powder | Relative lightness of luminescent film |
|---|---|---|---|
| 49 | $(Ca_{0.8}Mg_{0.2})O\cdot0.006CaS\cdot0.001CaSe\cdot Al_2O_3\cdot0.05B_2O_3{:}0.005Eu\cdot0.004Nd\cdot0.0005Tm$ | 116 | 115 |
| Comparative sample 49 | $(Ca_{0.8}Mg_{0.2})O\cdot Al_2O_3\cdot0.05B_2O_3{:}0.005Eu\cdot0.004Nd\cdot0.0005Tm$ | 100 | 100 |
| 50 | $2.85CaO\cdot0.02CaS\cdot3.0Al_2O_3\cdot0.05B_2O_3\cdot0.02P_2O_5{:}0.15Eu\cdot0.2Nd\cdot0.0001Er$ | 117 | 113 |
| Comparative sample 50 | $2.87CaO\cdot3.0Al_2O_3\cdot0.05B_2O_3{:}0.15Eu\cdot0.2Nd\cdot0.0001Er$ | 100 | 100 |
| 51 | $(Ca_{0.8}Sr_{0.1}Mg_{0.1})O\cdot0.01CaS\cdot Al_2O_3\cdot0.02B_2O_3\cdot0.02P_2O_5{:}0.005Eu\cdot0.004Nd\cdot0.0005Sm$ | 129 | 132 |
| Comparative sample 51 | $(Ca_{0.8}Sr_{0.1}Mg_{0.1})O\cdot Al_2O_3\cdot0.02B_2O_3{:}0.005Eu\cdot0.004Nd\cdot0.0005Sm$ | 100 | 100 |
| 52 | $0.95CaO\cdot0.003CaS\cdot0.003SrSe\cdot Al_2O_3\cdot0.01B_2O_3\cdot0.07P_2O_5{:}0.005Eu\cdot0.004Nd\cdot0.0005Ce$ | 126 | 124 |
| Comparative sample 52 | $0.95CaO\cdot Al_2O_3\cdot0.01B_2O_3{:}0.005Eu\cdot0.004Nd\cdot0.0005Ce$ | 100 | 100 |
| 53 | $0.98CaO\cdot0.01SrS\cdot1.05Al_2O_3\cdot0.3P_2O_5{:}0.005Eu\cdot0.005Nd\cdot0.004Pr\cdot0.001La$ | 108 | 111 |
| Comparative sample 53 | $0.98CaO\cdot1.05Al_2O_30.0015B_2O_3{:}0.005Eu\cdot0.005Nd\cdot0.004\ Pr\cdot0.001La$ | 100 | 100 |
| 54 | $2.0CaO\cdot0.15CaS\cdot1.8Al_2O_3\cdot0.03B_2O_3{:}0.15Eu\cdot0.1Nd\cdot0.004Sm\cdot0.05La$ | 108 | 113 |
| Comparative sample 54 | $2.0CaO\cdot1.8Al_2O_3\cdot0.03B_2O_3{:}0.15Eu\cdot0.1Nd\cdot0.004Sm\cdot0.05La$ | 100 | 100 |

The present invention also provides a long afterglow luminescent material with composite white luminescence color. The compositions, properties and preparation method of the material will be described with reference to examples 55-57.

| Raw material | Weight (g) |
|---|---|
| $CaCO_3$ | 50 |
| $SrCO_3$ | 73.82 |
| $Al_2O_3$ | 101.96 |
| $H_3BO_3$ | 2.47 |
| CaS | 0.007 |
| $(NH_4)_2HPO_4$ | 5.28 |
| $Eu_2O_3$ | 0.88 |
| $Nd_2O_3$ | 5.06 |

The raw materials of the above composition were ball-milled and mixed thoroughly, then charged into a crucible and put into an electric furnace, subsequently sintered in oxidizing atmosphere at 800° C. for 10 hours, the crucible was taken out after cooling. The sintered product in the crucible was naturally cooled to room temperature, and then sintered in a furnace through which a gas consisting of 100% hydrogen was passed, the furnace temperature was raised from 400° C. to 1450° C. over 6 hours, and kept at 1450° C. for 2 hours for sintering. Thereafter, the furnace temperature was dropped to 200° C. over 6 hours, and the crucible was taken out, and the sintered product in the crucible was naturally cooled to room temperature, and pulverized, and ground by ball-milling, and sieved with a 325 mesh sieve to give the luminescent material according to the present invention $(Sr_{0.5}Ca_{0.5})O.\ 0.0001\ CaS.Al_2O_3.\ 0.02B_2O_3.0.02P_2O_5{:}\ 0.005Eu.0.03Nd$. The material was labeled as Example 55.

EXAMPLE 55-57

The long afterglow luminescent materials of Example 56-57 with white luminescence color were prepared by the same method as in Example 55. The compositions are listed in Table 10. Since there was no long afterglow luminescent material with white luminescence color in the prior art, comparative sample was not available.

TABLE 10

| Example No. | Composition of Examples |
|---|---|
| 55 | $(Sr_{0.5}Ca_{0.5})O\cdot0.0001CaS.Al_2O_3\cdot0.02B_2O_3\cdot0.02P_2O_5{:}0.005Eu\cdot0.03Nd$ |
| 56 | $3.54SrO\cdot2.36CaO\cdot0.01CaS\cdot6.0Al_2O_3\cdot0.02B_2O_3{:}0.01Eu\cdot0.02Nd\cdot0.005Dy$ |
| 57 | $(Sr_{0.4}Ca_{0.6})O\cdot0.0001SrSe\cdot Al_2O_3\cdot0.02B_2O_3\cdot0.002P_2O_5{:}0.01Eu\cdot0.03Dy$ |

Another new discovery in this invention was described as follows. In case respectively introducing sulfur and/or selenium, or sulfur and/or selenium in combination with phosphorus into the composite aluminate structure, a long afterglow material with red luminescence color could be obtained with a strong emission peak at 590-620 nm, by charging the composition of the matrix, i.e. by adjusting in certain ranges the mole ratio of Sr and Al as well as the amounts (expressed in mole) of activator ions.

Now the present invention will be described with reference to Example 58-62.

| Raw material | Weight (g) |
|---|---|
| $SrCO_3$ | 664.34 |
| $Al_2O_3$ | 203.92 |
| $H_3BO_3$ | 2.47 |
| SrS | 35.9 |
| $(NH_4)_2HPO_4$ | 52.82 |
| $Eu_2O_3$ | 28.16 |
| $Tm_2O_3$ | 0.06 |

The raw materials of the above composition were ball-milled and mixed thoroughly, then charged into a crucible and put into an electric furnace, subsequently sintered in oxidizing atmosphere at 1000° C. for 2 hours, the crucible was taken out after cooling. The sintered product in the crucible was naturally cooled to room temperature, and then sintered in a furnace through which a mixture gas consisting of 88% hydrogen, 2% nitrogen and 10% hydrogen sulfide was passed, the furnace temperature was raised from 400° C. to 1100° C. over 8 hours, and kept at 1100° C. for 3 hours for sintering. Thereafter, the furnace temperature was dropped to 200° C. over 6 hours, and the crucible was taken out, and the sintered product in the crucible was naturally cooled to room temperature, pulverized, and ground by ball-milling, then sieved with a 325 mesh sieve to give a luminescent material according to the present invention ($4.5SrO \cdot 0.3SrS \cdot 2Al_2O_3 \cdot 0.02B_2O_3 \cdot 0.2P_2O_5$: $0.16Eu0.0003Tm$). The material was labeled as Example 58.

EXAMPLE 58-62

The long afterglow luminescent materials of Example 59-62 with red luminescence color were prepared by the same method as in Example 58. The compositions are listed in Table 11.

Figure 6:
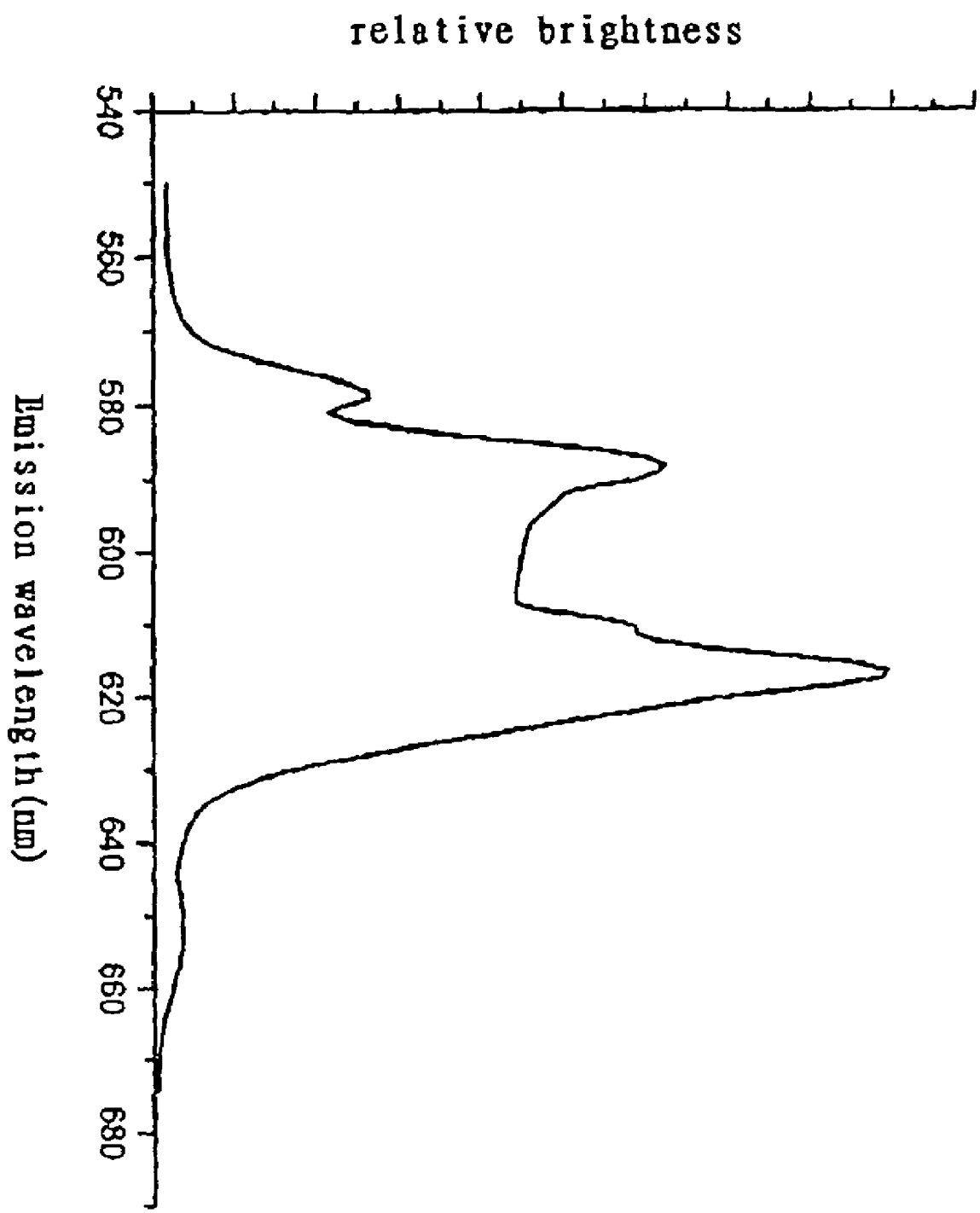
FIG. 6 the emission spectrum of sample of Example 58.

FIG. 6 clearly shows the emission peak of Example 58 was located at about 615 nm, and its afterglow luminescence was red in color. Comparing with conventional long afterglow luminescent material $SrS \cdot CaS \cdot 0.02B_2O_3$:$0.004Eu$ with red luminescence color, the long afterglow luminescent material with red luminescence color of the invention had better chemical stability and temperature resistance.

TABLE 11

| Example No. | Composition of Examples |
|---|---|
| 58 | $4.5SrO \bullet 0.3SrS \bullet 2Al_2O_3 \bullet 0.02B_2O_3 \bullet 0.2P_2O_5$:$0.16Eu \bullet 0.0003Tm$ |
| 59 | $0.6SrO \bullet 0.7SrS \bullet 0.5Al_2O_3 \bullet 0.02B_2O_3 \bullet 0.02P_2O_5$:$0.008Eu \bullet 0.0001Dy$ |
| 60 | $6.0SrO \bullet 1.5SrS \bullet 3.0Al_2O_3 \bullet 1.0P_2O_5$:$0.25Eu \bullet 0.05Tm \bullet 0.001Pr$ |
| 61 | $3.0SrO \bullet 2.0SrS \bullet 2.5Al_2O_3 \bullet 0.02B_2O_3$:$0.015Eu \bullet 0.0001Ce$ |
| 62 | $2.5SrO \bullet 0.4SrS \bullet 0.1SrSe \bullet 1.0Al_2O_3 \bullet 0.02B_2O_3 \bullet 0.02P_2O_5$:$0.04Eu \bullet 0.005Nd$ |

Another new discovery in this invention is described as follows. In case introducing sulphur and/or selenium, or sulfur and/or selenium in combination with phosphorus into the composite aluminate structure, the long afterglow materials with various luminescence colors of the invention exhibited much fast charge by adjusting the mole ratio of the alkaline earth metals and aluminum, as well as the contents of the rare earth activator ions. It is well known in the art a luminescent material with fast charge performance would be inevitably accompanied with very fast attenuation. Therefore such materials were greatly limited in practical applications. However, the present invention solves this problem very well, by providing long afterglow luminescent materials with both fast charge and slow attenuation.

Now the present invention will be discussed with reference to Example 63-65.

EXAMPLE 63

| Raw material | Weight (g) |
|---|---|
| $SrCO_3$ | 147.63 |
| $Al_2O_3$ | 96.86 |
| $H_3BO_3$ | 2.47 |
| SrS | 0.72 |
| $(NH_4)_2HPO_4$ | 5.28 |
| $Eu_2O_3$ | 8.8 |
| $Dy_2O_3$ | 5.6 |

The raw materials of the above composition were ball-milled and mixed thoroughly, then charged into a crucible and put into an electric furnace, subsequently sintered in oxidizing atmosphere at 800° C. for 8 hours. The crucible was taken out after oling. The sintered product in the crucible was naturally cooled to room temperature, and then sintered in a furnace through which a mixture gas consisting of 90% hydrogen, 5% nitrogen and 5% hydrogen sulfide was passed, the furnace temperature was raised from 400° C. to 1450° C. over 4 hours, and kept at 1450° C. for hours for sintering. Thereafter, the furnace temperature was dropped to 200° C. over 6 hours, and the crucible was taken out. The sintered product in the crucible was naturally cooled to room temperature, and pulverized, and ground by ball-milling, and then sieved with a 325 mesh sieve to give a luminescent material according to the present invention $SrO0.006SrS \cdot 0.95Al_2O_3 \cdot 0.02B_2O_3 0.02P_2O_5$:$0.05Eu0.03Dy$. The material was labeled as Example 63.

EXAMPLE 64

| Raw material | Weight (g) |
|---|---|
| $Sr(NO_3)_2$ | 952.34 |
| $Al(OH)_3$ | 1076.4 |
| $H_3BO_3$ | 61.83 |
| SrS | 0.36 |

-continued

| Raw material | Weight (g) |
|---|---|
| $(NH_4)_2HPO_4$ | 2.39 |
| $Eu_2O_3$ | 26.4 |
| $Dy_2O_3$ | 37.3 |

The raw materials of the above composition were ball-milled and mixed thoroughly, then charged into a crucible and put into an electric furnace, subsequently sintered in oxidizing atmosphere at 1000° C. for 20 hours, the crucible was taken out after cooling. The sintered product in the crucible was naturally cooled to room temperature, and then sintered in a furnace through which a mixture gas consisting of 62% hydrogen, 33% nitrogen and 5% hydrogen sulfide was passed, the furnace temperature was raised from 400° C. to 1550° C. over 18 hours, and kept at 1550° C. for 8 hours for sintering. Thereafter, the furnace temperature was dropped to 200° C. over 6 hours, and the crucible was taken out. The sintered product in the crucible was naturally cooled to room temperature, and pulverized, and ground by ball-milling, and sieved with a 325 mesh sieve, to give a luminescent material according to the present invention 4.5 SrO.0.03 SrS.6.9 $Al_2O_3$.0.5 $B_2O_3$.0.01 $P_2O_5$:0.15Eu0.20Dy. The material was labeled as Example 64.

EXAMPLE 65

| Raw material | Weight (g) |
|---|---|
| $CaCO_3$ | 100 |
| $Al_2O_3$ | 99.92 |
| $H_3BO_3$ | 1.7 |
| CaS | 0.36 |
| $(NH_4)_2HPO_4$ | 1.32 |
| $Eu_2O_3$ | 8.8 |
| $Nd_2O_3$ | 3.36 |

The raw materials of the above composition were ball-milled and mixed thoroughly, then charged into a crucible and put into an electric furnace, subsequently sintered in oxidizing atmosphere at 700° C. for 10 hours, the crucible was taken out after cooling. The sintered product in the crucible was naturally cooled to room temperature, and then sintered in a furnace through which a mixture gas consisting of 95% hydrogen, 3% nitrogen and 2% hydrogen sulfide was passed, the furnace temperature was raise from 400° C. to 1300° C. over 10 hours, and kept at 1300° C. for 5 hours for sintering. Thereafter, the furnace temperature was dropped to 200° C. over 6 hours, and the crucible was taken out, the sintered product in the crucible was naturally cooled to room temperature, and pulverized, and ground by ball-milling, then sieved with a 250 mesh sieve to give a luminescent material according to the present invention CaO.0.005 CaS.0.98$Al_2O_3$.0.01 $B_2O_3$.0.005$P_2O_5$: 0.05 Eu0.02$Nd_2O_3$. The material was labeled as Example 65.

Table 12 shows the compositions and brightness measurements of the powders and film products of Examples 63-65 in comparison with those of corresponding comparative samples of the prior art. The powers and films of all the samples were tested for brightness with the methods for faint light testing of powders and of films respectively.

TABLE 12

| Example No. | Composition of Examples | Relative brightness of powder | Relative brightness of luminescent film |
|---|---|---|---|
| 63 | SrO•006SrS•0.95$Al_2O_3$•0.02$B_2O_3$•0.02$P_2O_5$:0.05Eu•0.03Dy | 121 | 127 |
| Comparative sample 63 | 0.94SrO•$Al_2O_3$•0.02$B_2O_3$:0.005Eu•0.025Dy | 100 | 100 |
| 64 | 4.5SrO•0.003SrS•6.9$Al_2O_3$•0.5$B_2O_3$•0.01$P_2O_5$:0.15Eu•0.2Dy | 121 | 124 |
| Comparative sample 64 | 4.5SrO•6.9$Al_2O_3$•0.5$B_2O_3$:0.15Eu•0.2Dy | 100 | 100 |
| 65 | CaO•0.005CaS•0.98$Al_2O_3$•0.01$B_2O_3$•0.005$P_2O_5$:0.05Eu•0.02$Nd_2O_3$ | 114 | 112 |
| Comparative sample 65 | CaO•0.98$Al_2O_3$•0.01$B_2O_3$:0.05Eu•0.02Nd | 100 | 100 |

Figure 7:
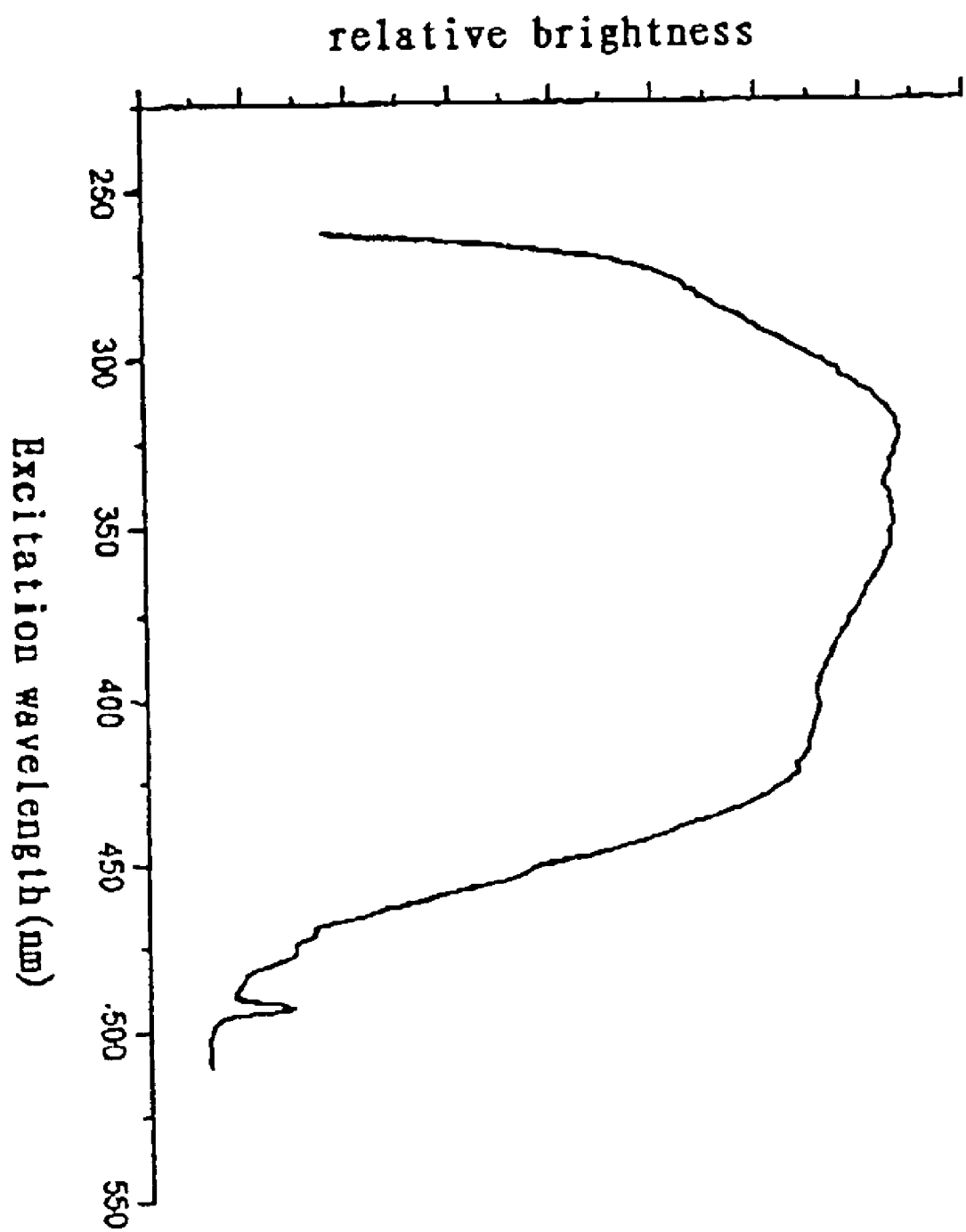
FIG. 7 the excitation spectrum of the luminescent powder sample of Example 63.
Figure 8:
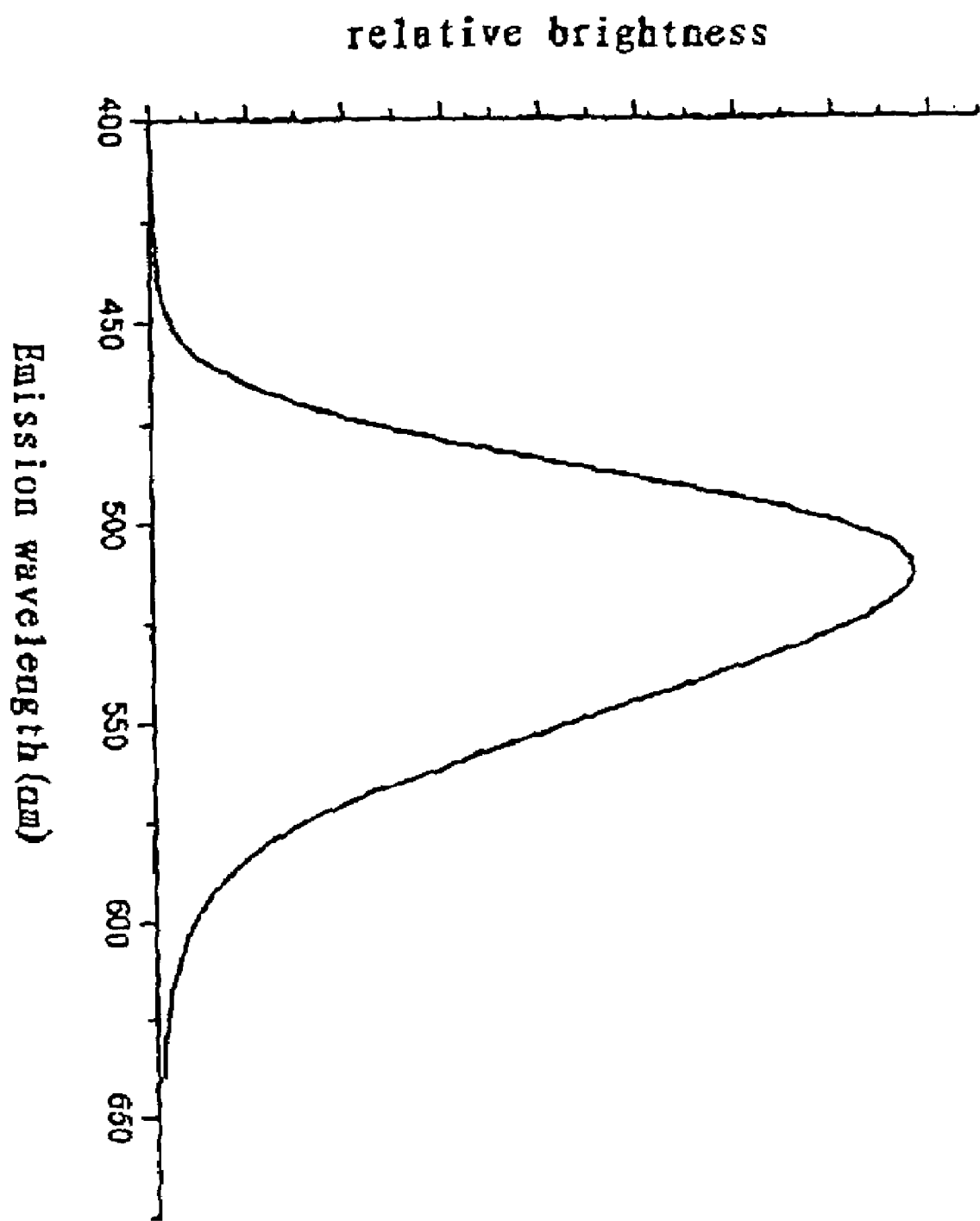
FIG. 8 the emission spectrum of the luminescent powder sample of Example 63.

FIG. 7 and FIG. 8 show the excitation spectrum and emission spectrum of the luminescent powder of Example 63. From the two figures, it can been seen that the luminescent powder of the example had a very broad excitation spectrum, and its emission spectrum was within the range of yellow-green light, the powder is very suitable to be used for indication under faint light conditions.

Figure 9:
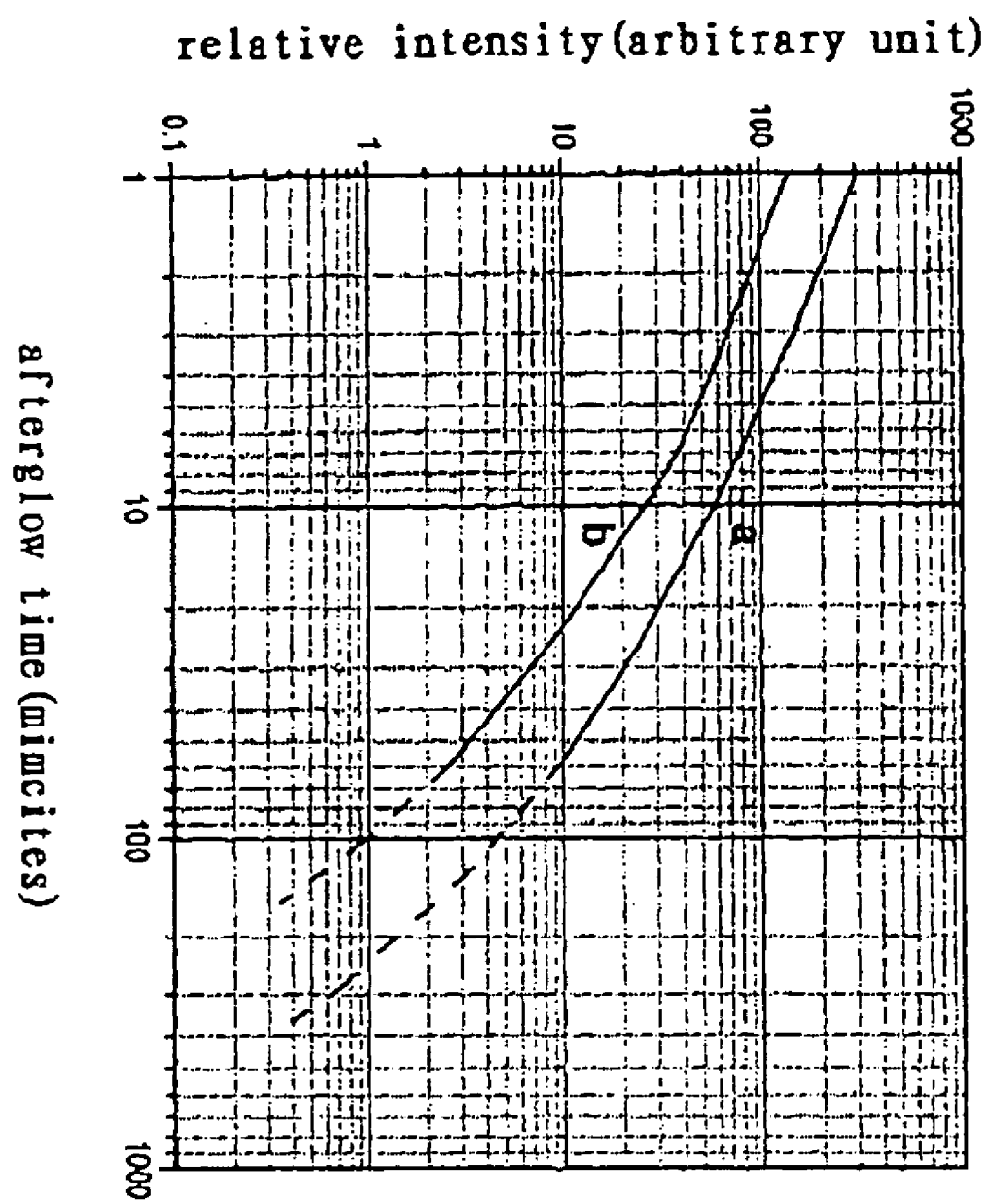
FIG. 9 the luminescence brightness after excitation as a function of afterglow time of the luminescent films of Example 63 and its corresponding comparative example.

FIG. 9 shows the attenuating curves of the luminescence brightness as a function of luminescence time of the luminescent film of Example 63 (curve a) and of the corresponding comparative example (curve b) after being exposed to 25 Lux illumination for 15 minutes under standard D65 light source. From the comparison of the curves, it can be seen clearly that, after the same excitation under faint light source, the initial brightness at the 1th minute and the brightness at the 60th minute of the products of Example 63 were much higher than those of the comparative sample, and the afterglow time was over 2 times as long as that of the comparative sample. Furthermore, the Examples according to this invention were demonstrated to have strong capability of fast charge under faint light condition, and its attenuation was low.

With reference to Table 12 and FIGS. 7-9, the present composite aluminate luminescent material comprising sulfur and/or selenium, or sulfur and/or selenium in combination with phosphorus, had much fast charge and much slower attenuation compared with the long afterglow luminescent materials of the prior art.

The inventors discovered the luminescence brightness of the materials could be improved to various extents by adding additives such as $NH_4Cl$, $NH_4F$, $(NH_4)_2HPO_4$, glucose, urea, $Li_2CO_3$, $SrF_2$, $CaF_2$, $CaSO_4$, SrS, CaS, $SrSO_4$, $SrHPO_4$, $CaHPO_4$ and the like in an amount of 0-30% based on the total weight of the raw materials, this will be explain by way of examples hereinafter.

EXAMPLE 66

A mixture was prepared according to the chemical composition of $SrO.0.001SrS.Al_2O_3.0.02B_2O_3$: 0.005Eu, 0.01Dy, with the addition of 30% (WT) urea. The detailed contents were as follows:

| Raw material | Weight (g) |
|---|---|
| $SrCO_3$ | 147.63 |
| $Al_2O_3$ | 101.96 |
| $H_3BO_3$ | 2.47 |
| SrS | 0.12 |
| $Eu_2O_3$ | 0.88 |
| $Dy_2O_3$ | 1.87 |
| urea | 76.48 |

The raw materials of the above composition were ball-milled and mixed thoroughly, then charged in a crucible and put into an electric furnace, subsequently sintered in oxidizing atmosphere at 1000° C. for 2 hours, the crucible was taken out after cooling. The sintered product in the crucible was naturally cooled to room temperature and covered by a lid, the product was then buried in a crucible filled with carbon particles and covered by a lid and put into a furnace, the furnace temperature was raised from 400° C. to 1200° C. over 8 hours, and kept at 1200° C. for 3 hours for sintering. Thereafter, the furnace temperature was dropped to 200° C. over 4 hours, and the crucible was taken out. The sintered product in the crucible was naturally cooled to room temperature, and pulverized, ground by ball-milling, and then sieved with a 325 mesh sieve to collect the luminescent particles. The material was labeled as Example 66.

After X-ray analysis, no new crystalline phase was identified, but the material obtained showed improvement in both afterglow brightness and slowdown of attenuation rate. Table 13 shows the comparison results.

It was proved by experiments that $NH_4Cl$, $NH_4F$, $(NH_4)_2HPO_4$, glucose, urea, $SrHPO_4$ or $CaHPO_4$ had similar effect to urea.

EXAMPLE 67

A mixture was prepared according to the chemical composition of $4SrO.7Al_2O_3.0.04B_2O_3.0.02P_2O_5$: 0.005Eu, 0.001Dy, with the addition of 1% (WT) $CaSO_4$. The detailed contents were as follows:

| Raw material | Weight (g) |
|---|---|
| $SrCO_3$ | 147.63 |
| $Al_2O_3$ | 178.43 |
| $H_3BO_3$ | 4.94 |
| $(NH_4)_2HPO_4$ | 5.28 |
| $Eu_2O_3$ | 0.88 |
| $Dy_2O_3$ | 0.19 |
| $CaSO_4$ | 3.37 |

The raw materials of the above composition were ball-milled and mixed thoroughly, then charged into a crucible and put into an electric furnace, subsequently sintered in oxidizing atmosphere at 1000° C. for 15 hours, the crucible was taken out after cooling. The sintered product in the crucible was naturally cooled to room temperature, and then sintered in a furnace through which a mixture gas consisting of 100% ammonia was passed, the furnace temperature was raised from 400° C. to 1450° C. over 8 hours, and kept at 145° C. for 10 hours for sintering. Thereafter, the furnace temperature was dropped to 200° C. over 8 hours, and the crucible was taken out. The sintered product in the crucible was naturally cooled to room temperature, and pulverized, ground by ball-milling, and then sieved with a 325 mesh sieve to collect the luminescent particles. The material was labeled as Example 67.

After testing, the material obtained showed improvements in afterglow brightness and the slowdown of attenuation rate. Table 14 shows the comparison results.

TABLE 13

| Example No. | Composition of Examples | Relative brightness of powder | Relative brightness of luminescent film |
|---|---|---|---|
| 66 | $SrO•0.001SrS•Al_2O_3•0.02B_2O_3$:0.005Eu•0.01Dy + 30%(WT)urea | 108 | 110 |
| Comparative sample 66 | $SrO•0.001SrS•Al_2O_3•0.02B_2O_3$:0.005Eu•0.01Dy | 100 | 100 |

TABLE 14

| Example No. | Composition of Examples | Relative brightness of powder | Relative brightness of luminescent film |
|---|---|---|---|
| 67 | 4SrO•7Al$_2$O$_3$•0.04B$_2$O$_3$•0.02P$_2$O$_5$:0.005Eu•0.001Dy + 1% (WT) CaSO$_4$ | 105 | 107 |
| Comparative sample 67 | 4SrO•7Al$_2$O$_3$•0.04B$_2$O$_3$•0.02P$_2$O$_5$:0.005Eu•0.001Dy | 100 | 100 |

It was proved by experiment that SrS, CaS and SrSO$_4$ all had similar effect.

EXAMPLE 68

A mixture was prepared according to the chemical composition of CaO.0.001CaS.Al$_2$O$_3$.0.01B$_2$O$_3$.0.02 P$_2$O$_5$: 0.002Eu.0.005Nd, with the addition of 10% (WT) CaF$_2$. The detailed contents were as follows:

| Raw material | Weight (g) |
|---|---|
| CaCO$_3$ | 100 |
| Al$_2$O$_3$ | 101.96 |
| CaS | 0.072 |
| H$_3$BO$_3$ | 1.74 |
| (NH$_4$)$_2$HPO$_4$ | 30 |
| Eu$_2$O$_3$ | 0.35 |
| Nd$_2$O$_3$ | 0.84 |
| CaF$_2$ | 23.49 |

The raw materials of the above composition were ball-milled and mixed thoroughly, then charged in a crucible and put into an electric furnace, subsequently sintered in oxidizing atmosphere at 700° C. for 10 hours, the crucible was taken out after cooling. The sintered product in the crucible was naturally cooled to room temperature, and then sintered in a furnace through which a mixture gas consisting of 100% hydrogen was passed, the furnace temperature was raised from 400° C. to 1300° C. over 10 hours, and kept at 1300° C. for 5 hours for sintering. Thereafter, the furnace temperature was dropped to 200° C. over 6 hours, and the crucible was taken out, the sintered product in the crucible was naturally cooled to room temperature, and pulverized, ground by ball-milling, and then sieved with a 325 mesh sieve to collect the luminescent particles. The material was labeled as Example 68.

After testing, the material obtained showed improvements in afterglow brightness and the slowdown of attenuation rate. Table 15 shows the comparison results.

It was proved by experiments that both Li$_2$CO$_3$ and SrF$_2$ had the similar effect.

INDUSTRIAL APPLICATION

The products in this invention can be widely used in all kinds of long afterglow products as indicators or ornaments in dark environment, combined with paint; plastics; printing ink; rubber etc. These luminescent materials find good applications in fields of architecture, traffic, decoration, watch and clock dials, fishing tackles, toys and other goods for daily use, and especially suitable for the production of long afterglow safety products, such as warning, mandatory and escape-route signs. These materials also can be used for white LED.

The invention claimed is:

1. A long afterglow luminescent material, characterized in that it is a composite aluminate luminescent material comprising sulfur and/or selenium, or comprising sulfur and/or selenium and phosphorus as well as activator ions, its main chemical composition is expressed by the following formula:

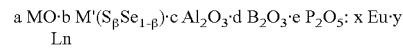
a MO·b M'(S$_\beta$Se$_{1-\beta}$)·c Al$_2$O$_3$·d B$_2$O$_3$·e P$_2$O$_5$: x Eu·y Ln wherein:
M is/are selected from Sr, Ca, Ba, and Mg, and any combinations thereof;
M' is/are selected from Sr, Ca, and Ba, and any combinations thereof;
Ln is/are selected from Nd, Dy, Ho, Tm, La, Ce, Er, Pr, Bi, and Sm, and any combinations thereof;
a, b, c, d, e, x and y are mole ratios, wherein 0.5<a<6.0, 0.0001≦b≦2.0, 0.5≦c≦9.0, 0≦d≦1.0, 0≦e≦1.0, 0.00001≦x≦0.25, 0.00001≦y≦0.3, 0≦β≦1.0, 0.5<(a+b)≦6.0, 0<(d+e)≦1.0.

2. The long afterglow luminescent material according to claim 1, wherein, in the formula, M is/are selected from Sr, Ca, and Mg, and any combinations thereof; M' is/are selected from Sr, and Ca, and any combinations thereof; Ln is/are selected from Nd, Dy, Tm, La, Pr, Sm, and Ce, and any combinations thereof, wherein, after excited by light with wavelength below 500nm, the material emits a spectrum between 420-650nm with a peak located within 440-620nm, and exhibits long afterglow luminescence colors selecting

TABLE 15

| Example No. | Composition of Examples | Relative brightness of powder | Relative brightness of luminescent film |
|---|---|---|---|
| 68 | CaO•0.001CaS•Al$_2$O$_3$•0.01B$_2$O$_3$•0.02P$_2$O$_5$:0.002Eu•0.005Nd + 10% (WT)CaF$_2$ | 110 | 113 |
| Comparative sample 68 | CaO•0.001CaSAl$_2$O$_3$•0.01B$_2$O$_3$•0.02P$_2$O$_5$:0.002Eu•0.005Nd | 100 | 100 | from purple-blue, blue-green, yellow-green, white and red, and wherein the material has fast charge.

3. The long afterglow luminescent material according to claim 1, wherein, in the formula, e=0 and M' is/are selected from Sr, and Ca, and any combinations thereof.

4. The long afterglow luminescent material according to claim 1, wherein, in said chemical composition formula, e≠0 and M' is/are selected from Sr, and Ca, and any combinations thereof.

5. The long afterglow luminescent material according to claim 1, wherein said mole ratios satisfy: 0.5<a<6.0, 0.0001≦b≦0.1, 0.5≦c≦6.6, 0≦d≦1.0, 0≦e≦1.0, 0.001≦x≦0.1, 0.001≦y≦0.2, 0≦β≦1.0, wherein 0.5<(a+b)≦6.0, 0<(d+e)≦1.0, (a+b)/c=0.8-1.2; the amount (expressed in mole) of Sr is no less than 3.5 times as much as the sum of Ca and Mg; or the amount (expressed in mole) of Sr is over 3.5 times as much as that of Ca or Mg; and the long afterglow luminescence color is yellow-green after excitation.

6. The long afterglow luminescent material according to claim 1, wherein said mole ratios satisfy: 0.5<a<6.0, 0.0001≦b≦0.1, 0.75<c≦9.0, 0≦d≦1.0, 0≦e≦1.0, 0.001≦x≦0.1, 0.001≦y≦0.2, 0≦β≦1.0, wherein 0.5<(a+b)≦6.0, 0<(d+e)≦1.0, c/(a+b)=1.5-1.9; and the long afterglow luminescence color is blue-green after excitation.

7. The long afterglow luminescent material according to claim 1, wherein said mole ratios satisfy: 0.5<a<6.0, 0.0001≦b≦0.1, 0.5≦c≦6.6, 0≦d≦1.0, 0≦e≦1.0, 0.001≦x≦0.1, 0.001≦y≦0.2, 0≦β≦1.0, wherein 0.5≦(a+b)≦6.0, 0<(d+e)≦1.0(a+b)/c=0.8-1.2; the amount (expressed in mole) or Ca is no less than 3.5 times as much as that of Sr and Mg; or the amount (expressed in mole) or Ca is no less than 3.5 times as much as that of Sr or Mg; and the long afterglow luminescence color is purple-blue after excitation.

8. The long afterglow luminescent material according to claim 1, wherein said mole ratios satisfy: 0.5<a<6.0, 0.0001≦b≦0.1, 0.5≦c≦6.6, 0≦d≦1.0, 0≦e≦1.0, 0.001≦x≦0.1, 0.001≦y≦0.2, 0≦β≦1.0, wherein 0.5<(a+b)≦6.0, 0<(d+e)≦1.0, (a+b)/c=0.9-1.1; the ratio of the amount (expressed in mole) of Ca to that of Sr is between 0.6 and 1.5; and the long afterglow luminescence color is white after excitation.

9. The long afterglow luminescent material according to claim 1, wherein said mole ratios satisfy: 0.5<a<6.0, 0.01≦b≦1.5, 0.5≦c≦3.5, 0≦d≦1.0, 0≦e≦1.0, 0.001≦x≦0.2, 0.00001≦y≦0.2, 0≦β≦1.0, wherein 0.5<(a+b)≦6.0, 0<(d+e)≦1.0, (a+b)/c=2.0-3.3; and the long afterglow luminescence color is red after excitation.

10. The long afterglow luminescent material according to claim 1, wherein said mole ratios satisfy: 0.01≦x≦0.25, 0.01≦y≦0.3; and the material has fast charge.

11. A method for preparing a long afterglow luminescent material, wherein the raw materials used are compounds of following elements, or sulfur and/or selenium is(are) used in elemental form, the elements are formulated with the mole ratios satisfying the formula aMO·bM'(S$_\beta$Se$_{1-\beta}$)·c Al$_2$O$_3$·dB$_2$O$_3$·eP$_2$O$_5$: xEu·yLn wherein:

M is/are selected from Sr, Ca, Ba, and Mg, and any combinations thereof;

M' is/are selected from Sr, Ca, and Ba, and any combinations thereof;

Ln is/are selected from Nd, Dy, Ho, Tm, La, Ce, Er, Pr, Bi, and Sm, and any combinations thereof;

a, b, c, d, e, x and y are mole ratios, wherein 0.5<a<6.0, 0.0001≦b≦2.0, 0.5≦c≦9.0, 0≦d≦1.0, 0≦e≦1.0, 0.00001≦x≦0.25, 0.00001≦y≦0.3, 0≦β1.0, 0.5<(a+b)≦6.0, 0<(d+e)≦1.0;

M: 0.5-6;
M': 0.0001-2.0;
S: 0.0001-2.0;
Se: 0.0001-2.0;
Al: 1.0-18;
B: 0-2.0;
P: 0-2.0;
Eu: 0.00001-0.25;
Ln: 0.00001-0.3;

the preparation process is a high temperature solid-stage reaction method, the raw materials of elements are weighted and mixed homogeneously to form a mixture, the mixture is firstly sintered at a temperature between 700 and 1100° C. for 2-20 hours in oxidative atmosphere, then sintered at a temperature between 1100 and 1550° C. for 2-30 hours in reducing atmosphere, and then cooled, pulverized and sieved.

12. The method for preparing long afterglow luminescent materials according to claim 11, wherein said reductive atmosphere is selected from hydrogen, ammonia, nitrogen and hydrogen or the presence of carbon particles.

13. The method for preparing long afterglow luminescent materials according to claim 12, wherein said reductive atmosphere comprises no more than 10% H$_2$S.

14. The method for preparing long afterglow luminescent materials according to claim 11, wherein NH$_4$Cl, NH$_4$F, (NH$_4$)$_2$HPO$_4$, glucose, urea, Li$_2$CO$_3$, SrF$_2$, CaF$_2$, CaSO$_4$, SrS, CaS, SrSO$_4$, SrHPO$_4$ or CaHPO$_4$, is added in an amount of 0-30wt% based on the weight of the raw materials into the raw materials to participate the solid-phase reaction.

15. The long afterglow luminescent material according to claim 2, wherein, in the formula, e=0 and M' is/are selected from Sr, and Ca, and any combinations thereof.

16. The long afterglow luminescent material according to claim 2, wherein, in said chemical composition formula, e≠0and M' is/are selected from Sr, and Ca, and any combinations thereof.

17. The long afterglow luminescent material according to claim 2, wherein said mole ratios satisfy: 0.5<a<6.0, 0.0001≦b≦0.1, 0.5≦c≦6.6, 0≦d≦1.0, 0≦e≦1.0, 0.001≦x≦0.1, 0.001≦y≦0.2, 0≦β≦1.0, wherein 0.5<(a+b)≦6.0, 0<(d+e)≦1.0, (a+b)/c=0.8-1.2; the amount (expressed in mole) of Sr is no less than 3.5 times as much as the sum of Ca and Mg; or the amount (expressed in mole) of Sr is over 3.5 times as much as that of Ca or Mg; and the long afterglow luminescence color is yellow-green after excitation.

18. The long afterglow luminescent material according to claim 2, wherein said mole ratios satisfy: 0.5<a<6.0, 0.0001≦b≦0.1, 0.75<c≦9.0, 0≦d≦1.0, 0≦e≦1.0, 0.001≦x≦0.1, 0.001≦y≦0.2, 0≦β≦1.0, wherein 0.5<(a+b)≦6.0, 0<(d+e)≦1.0, c/(a+b)=1.5-1.9; and the long afterglow luminescence color is blue-green after excitation.

19. The long afterglow luminescent material according to claim 1, wherein said mole ratios satisfy: 0.5<a<6.0, 0.0001≦b≦0.1, 0.5≦c≦6.6, 0≦d≦1.0, 0≦e≦1.0, 0.001≦x≦0.1, 0.001≦y≦0.2, 0≦β≦1.0, wherein 0.5≦(a+b)≦6.0, 0<(d+e)≦1.0 (a+b)/c=0.8-1.2; the amount (expressed in mole) or Ca is no less than 3.5 times as much as that of Sr and Mg; or the amount (expressed in mole) or Ca is no less than 3.5 times as much as that of Sr or Mg; and the long afterglow luminescence color is purple-blue after excitation.

20. The long afterglow luminescent material according to claim 2, wherein said mole ratios satisfy: 0.5<a<6.0, 0.0001≦b≦0.1, 0.5≦c≦6.6, 0≦d≦1.0, 0≦e≦1.0, 0.001≦x≦0.1, 0.001≦y≦0.2, 0≦β≦1.0, wherein 0.5<(a+b)≦6.0, 0<(d+e)≦1.0, (a+b)/c=0.9-1.1; the ratio of the amount (expressed in mole) of Ca to that of Sr is between 0.6 and 1.5; and the long afterglow luminescence color is white after excitation.

21. The long afterglow luminescent material according to claim 2, wherein said mole ratios satisfy: $0.5<a<6.0$, $0.01 \leqq b \leqq 1.5$, $0.5 \leqq c \leqq 3.5$, $0 \leqq d \leqq 1.0$, $0 \leqq e \leqq 1.0$, $0.001 \leqq x \leqq 0.2$, $0.00001 \leqq y \leqq 0.2$, $0 \leqq \beta \leqq 1.0$, wherein $0.5 < (a+b) \leqq 6.0$, $0 < (d+e) \leqq 1.0$, $(a+b)/c=2.0\text{-}3.3$; and the long afterglow luminescence color is red after excitation.

22. The long afterglow luminescent material according to claim 2, wherein said mole ratios satisfy: $0.01 \leqq x \leqq 0.25$, $0.01 \leqq y \leqq 0.3$; and the material has fast charge.

* * * * *